United States Patent
Lopareva et al.

(10) Patent No.: US 12,347,303 B2
(45) Date of Patent: Jul. 1, 2025

(54) DEVICES AND SYSTEMS FOR BREAK-IN PREVENTION

(71) Applicant: SECURITY ALARMS & CO. S.A., Preverenges (CH)

(72) Inventors: Natalia Lopareva, Forel (CH); Marc Kuhn, Gockhausen (CH); Samuel Schüller, Aadorf (CH)

(73) Assignee: ALGORIZED SARL, Etoy (CH)

( * ) Notice: Subject to any disclaimer, the term of this patent is extended or adjusted under 35 U.S.C. 154(b) by 0 days.

(21) Appl. No.: 18/031,205

(22) PCT Filed: Oct. 14, 2021

(86) PCT No.: PCT/EP2021/078451
§ 371 (c)(1),
(2) Date: Apr. 11, 2023

(87) PCT Pub. No.: WO2022/079170
PCT Pub. Date: Apr. 21, 2022

(65) Prior Publication Data
US 2024/0029546 A1 Jan. 25, 2024

Related U.S. Application Data

(60) Provisional application No. 63/092,157, filed on Oct. 15, 2020, provisional application No. 63/092,149, filed on Oct. 15, 2020.

(51) Int. Cl.
*G08B 31/00* (2006.01)
*G01S 7/41* (2006.01)
(Continued)

(52) U.S. Cl.
CPC .............. *G08B 31/00* (2013.01); *G01S 7/411* (2013.01); *G01S 7/415* (2013.01);
(Continued)

(58) Field of Classification Search
CPC .... G08B 31/00; G08B 13/1672; G08B 29/02; G08B 29/186; H04L 63/0823
See application file for complete search history.

(56) References Cited

U.S. PATENT DOCUMENTS 5,192,931 A * 3/1993 Smith .................... G08B 13/04
340/544
9,167,242 B1 * 10/2015 Meyer ............... H04M 1/72409
(Continued)

FOREIGN PATENT DOCUMENTS

CN  110 456 320 A  11/2019
FI  117992 B  * 5/2007
(Continued)

OTHER PUBLICATIONS

International Search Report, European Patent Office, Apr. 21, 2022.
Written Opinion ISA, European Patent Office, Apr. 21, 2022.

*Primary Examiner* — Curtis A Kuntz
*Assistant Examiner* — James E Munion
(74) *Attorney, Agent, or Firm* — Bay State IP, LLC

(57) ABSTRACT

A device which includes a microphone configured to detect a noise from a surrounding area of the device; an electronic circuit coupled to the microphone, wherein the electronic circuit comprises (i) at least one low-pass filter configured to filter the detected noise and (ii) a frequency-to-voltage converter configured to convert a frequency of the filtered detected noise into a voltage; a machine learning unit comprising a processor and a memory, wherein the processor is configured to analyze the detected noise using a machine learning algorithm stored in the memory; and an alarm unit configured to receive, from the machine learning unit, information on the analyzed detected noise and to receive, from the electronic circuit, the voltage.

13 Claims, 21 Drawing Sheets

(51) Int. Cl.
   *G08B 13/16* (2006.01)
   *G08B 29/02* (2006.01)
   *G08B 29/18* (2006.01)
   *H04L 9/40* (2022.01)

(52) U.S. Cl.
   CPC ......... *G08B 13/1672* (2013.01); *G08B 29/02* (2013.01); *G08B 29/186* (2013.01); *H04L 63/0823* (2013.01)

(56) References Cited

U.S. PATENT DOCUMENTS

| | | | |
|---|---|---|---|
| 11,030,410 B2* | 6/2021 | Murphy | G06F 16/353 |
| 2018/0040222 A1 | 2/2018 | Findlay | |
| 2020/0252587 A1* | 8/2020 | Sun | G03B 17/02 |

FOREIGN PATENT DOCUMENTS

| | | | | |
|---|---|---|---|---|
| JP | 2020 140277 A | 9/2020 | | |
| SE | 461 815 B | 3/1990 | | |
| WO | WO-2012040653 A1 * | 3/2012 | ............ | G06F 1/263 |
| WO | 2016/011433 A2 | 1/2016 | | |
| WO | 2019/183339 A1 | 9/2019 | | |
| WO | 2020/037399 A1 | 2/2020 | | |
| WO | 2020/159278 A2 | 8/2020 | | |

* cited by examiner

PCB Stackup:

| | | |
|---|---|---|
| Top: | Copper | 0.035m |
| Sub1: | RO4350B | 2.54mm |
| Inner1: | Copper | 0.035mm |
| Prep1: | RO4450F | 0.102mm |
| Sub2: | RO4350B | 2.54mm |
| Prep2: | RO4450F | 0.102mm |
| Inner2: | Copper | 0.035mm |
| Sub3: | RO4350B | 0.254mm |
| Bot: | Copper | 0.035mm |

DEVICES AND SYSTEMS FOR BREAK-IN PREVENTION

CROSS REFERENCE TO RELATED APPLICATION

This application is for entry into the U.S. National Phase from which priority is claimed under all applicable sections of Title 35 of the United States Code including, but not limited to, Sections 120, 363, and 365(c) to International Application No. PCT/EP2021/078451 filed on Oct. 14, 2021, and which in turn claims priority under 35 USC 119 to United States Patent Application No. 63/092,149 filed on Oct. 15, 2020 and United States Patent Application No. 63/092,157 filed on Oct. 15, 2020.

FIELD OF THE INVENTION

The present invention generally relates to devices in particular for break-in prevention and a system in particular for break-in prevention comprising the devices. One device comprises a microphone, an electronic circuit, a machine learning unit and an alarm unit. The second device comprises a transmitter, a receiver, an electronic circuit, a machine learning unit and an alarm unit. The system comprises the two devices coupled via an encrypted connection.

BACKGROUND TO THE INVENTION

Security systems for homes and businesses have been used for many years. These security systems make use of multiple types of sensors such as door and window sensors, motion detectors, sound detectors on a surface inside or outside of premises, and communicate with a control panel to detect intrusion of any unauthorized person in the secured premises. Once intrusion or an alarming event is detected, the control panel emits a siren and/or sends alerts over the mobile or fixed network to individuals in case of self-monitoring or communicates the alarming event to the monitoring service providers in the case that the security services are monitored by security personnel. In the case of monitoring service providers, highly trained operators can request a dispatch of first responders such as paramedics, firefighters, and law enforcement officers, or take other action on behalf of the system owner in response to the alarming event.

Usually, the sensors used in the security systems comprise of simplified triggers such as the opening of a door or a window, detecting motion around the sensors, or the like. The sensors have limited knowledge of whether the triggers are caused by a true break-in or by a false break-in e.g. a user returning home or authorized person approaching the building. Furthermore, currently used sensors are unable to detect when an event has already happened or are too late. Due to lack of intelligence, the current security systems frequently generate false alarms which cause an unnecessary burden on first responders such as paramedics, firefighters or the like, and may increase the cost of the alarm monitoring system to the home owner by generating fines or the use of additional hardware to help verify that the event is actually an alarm event.

Typically, the security systems are connected through cloud-based solutions and all the monitored data is stored in centralized servers. Intelligence of sensors, if present, is generally treated by the computations of the centralized server, relying solely on quality of connectivity and server intelligence, and in event of lack of connection quality and server intelligence, the security system may fail to perform.

Additionally, communication between devices and central control panel (offline connectivity) and/or to the external network (online connectivity) generally use standard connectivity protocols. Such offline and/or online connectivity can be breached in the absence of encryption and additional security measures. In addition, high dependency of such devices on the Internet connectivity limit devices' operations and alerts during the power and Internet outage.

Intelligence of sensors, if present, is generally treated by the computations of the centralized server, relying solely on quality of connectivity and server intelligence, and in event of lack of such connectivity, may fail to perform.

In some scenarios, detection of human presence is generally treated by movement sensors fitted in the passive infrared sensors within a device. However, this solution is limited by its intelligence, the generation of false alerts or by the video camera which can be intrusive and jeopardize privacy.

Therefore, there exists a long felt need in the art for a global security system to protect premises from intrusion or break-ins. There is also a long felt need in the art for a security system that effectively triggers alarms in case of any break-ins or intrusions. There is also a long felt need in the art for a security system that detects if the trigger is due to true break-in or false break-in, and accordingly raises an alarm for a user. Additionally, there is a long felt need in the art for a global security system that minimizes the cost of the alarm monitoring system for the user. Moreover, there is a long felt need in the art for a security system that enables secure communication between security management devices and central panel and/or external network. Further, there is a long felt need in the art for a global security system that combines intelligence procedures in sensors.

SUMMARY OF THE INVENTION

There is also a long felt need in the art for a truly preventive private security system and method that combines preventive security mechanisms and break-in devices with security of data in a conjunction of the following elements: methods, algorithms, offline and online machine learning (ML) elements, predictive break-in models and related device and its processing circuitry to prevent physical premises and user's data from break-ins.

In this manner, the present invention accomplishes all of the forgoing objectives and long felt needs, and provides a relatively safe, convenient and effective solution to detect true break-ins and accordingly generate true alarms. The present invention is also user friendly, inasmuch as the system reduces false alarm trigger rates and reduces the cost added to the security system due to generation of false alarms. Moreover, the security system checks the quality of the network and its compliance to the security protocols in order to maintain a secure network connection between the security devices and the servers, thereby preventing any breach of data.

The invention is set out in the independent claims. Preferred embodiments of the invention are set out in the dependent claims.

According to a first aspect, we describe a device in particular for break-in prevention. The device comprises a microphone configured to detect a noise from a surrounding area of the device; an electronic circuit coupled to the microphone, wherein the electronic circuit comprises (i) at least one low-pass filter configured to filter the detected noise and (ii) a frequency-to-voltage converter configured to convert a frequency of the filtered detected noise into a voltage; a machine learning unit comprising a processor and a memory, wherein the processor is configured to analyze the detected noise using a machine learning algorithm stored in the memory; and an alarm unit configured to receive, from the machine learning unit, information on the analyzed detected noise and to receive, from the electronic circuit, the voltage.

The microphone may be any suitable microphone that is configured to detect, in some examples, noises in the human inaudible range. Additionally or alternatively, the microphone may be able to detect noises in the human audible range. Additionally, or alternatively, the microphone may be able to detect noises with frequencies which are above the human audible range. In some examples, the microphone may have an operational frequency of 20 to 16000 Hertz. In some examples, the microphone may have an operational frequency of below 20 Hertz. In some examples, the microphone may be a microphone which is commercially available.

The electronic circuit is configured to filter the noise detected by the microphone. The electronic circuit comprises a low-pass filter in order to filter the detected noise. The electronic circuit may comprise a plurality of low-pass filters with progressively lower thresholds. In some examples, the electronic circuit further comprises components such as resistors, operational amplifiers, voltage boosters and the like. The electronic circuit further comprises a frequency-to-voltage converter configured to convert a frequency of the filtered detected noise into a voltage. The voltage-to-frequency converter may comprise a resistor-capacitor (RC) circuit suitable for converting the frequency of the filtered detected noise into a voltage. In some examples, the frequency-to-voltage converter also takes into account the amplitude of the frequency waves. The electronic circuit may be coupled to any number of other components within the device.

The machine learning unit comprises a processor and a memory and is configured to analyze the detected low frequency wave spikes by the processor based on a machine learning algorithm, stored in the memory. In some examples, the machine learning unit comprises a processor and a memory and is configured to analyze a low frequency wave spike within the detected noise detected by the processor based on a machine learning algorithm. In some examples, the machine learning algorithm may classify a detected low frequency wave spike as a break-in attempt spike. In some examples, the machine learning unit uses a plurality of machine learning algorithms. The memory may store the machine learning algorithm, previous results of the machine learning algorithm, and methods of machine learning. The processor may be configured to execute instructions stored by the memory. In some examples, the machine learning unit comprises a transceiver configured to transmit results from the machine learning unit and to receive updates to the machine learning algorithm. The machine learning may be supervised learning, unsupervised learning, semi-supervised learning, reinforcement learning, any other suitable type of learning or any combination thereof. The machine learning unit may be coupled to any number of other components within the device.

The alarm unit is configured to receive information on the analyzed detected noise from the machine learning unit and the voltage from the electronic circuit. In some examples, the voltage is the voltage output by the frequency-to-voltage converter. The alarm unit may contain a processor and a memory. The memory may store (data regarding) predetermined (one or more) conditions for activating the alarm unit. The processor may be configured to execute instructions stored in the memory.

In some examples, the device is coupleable to a physical server and/or a cloud server, wherein the physical server and/or the cloud server is configured to receive a signal from the device. In some examples, the coupling is via a wired and/or wireless router and/or mobile network. In some examples, if the device detects an interruption in the network, the device switches to a different network. As a non-limiting example, if the device detects an interruption in the wired coupling to the router, the device may then switch to a wireless coupling to the router or to the mobile network so as to ensure that there is a coupling to the physical server and/or the cloud server. In some examples, the device comprises a battery in case of a power outage. In some examples, the device notifies a user if there is a power outage. The signal may comprise information about the device and/or the machine learning unit and/or the alarm unit and/or the microphone. This may allow for a secure storage of device results in a separate location. In some examples, the device is connected to Internet using mobile network.

In some examples, the device is embeddable in a router or any other (stationary or mobile/moving) device such as, for example, a mobile camera, a drone or a robot. This may allow for a discrete (secretive) device. The router or any other (stationary or mobile/moving) device may comprise any number of the components mentioned in relation to the device. In this example, the device or any other (stationary or mobile/moving) device may comprise a circuitry board configured to comprise sound filtering similar to the electronic circuit described in this disclosure as well as a microphone and design common pins configured to be coupled to the pins of circuitry board of any router.

In some examples, a metric relating to a building where the device is located is stored in the memory. This memory is preferably the memory of the machine learning unit but may be a separate memory unit. This metric may be an area of the building, a material from which the building is built from, a number of people who are expected within the building, a number of doors and/or windows within the building, any other suitable metric regarding the building or any combination thereof. This may allow for a customizable device which is able to be altered depending on environmental conditions.

In some examples, the alarm unit is configured to trigger an alarm if the analyzed detected noise and/or the voltage satisfy respective predetermined conditions. In some examples, the alarm unit may also be configured to trigger an alarm if the analyzed detected noise is generated from external impact on doors or windows. The predetermined conditions may be an indication from the machine learning unit that the analyzed detected noise is consistent with a break-in and/or if the voltage exceeds/falls below a predetermined threshold. The machine learning unit may be trained by the machine learning algorithm to identify a noise which is consistent with a break-in. The machine learning unit may be trained by comparing a received voltage from, for example, the frequency-to-voltage converter with an acceptable threshold limit and/or with the metric described above.

The voltage may be output by the frequency-to-voltage converter which converts a frequency into a voltage. In some examples, if the memory of the alarm unit receives an indication from the machine learning unit that the detected noise is consistent with a break-in and the voltage output is above a predetermined threshold, the memory may send an instruction to the processor to sound an alarm. This may allow for a reliable security system and a reduction in the number of false-positives.

In some examples, the electronic circuit further comprises a variable resistor configured to alter the predetermined condition for the voltage. In some examples, the variable resistor is a potentiometer. The value of the variable resistor may be changed in order to raise and/or lower the predetermined condition for the voltage and/or the voltage threshold. This may be advantageous in situations where the device is moved to different buildings and the area which is wished to be monitored by the device changes. In particular, a higher threshold voltage may be used for smaller monitoring areas and a lower threshold voltage may be used for larger monitoring areas. This may allow for a customizable device which is able to be altered depending on environmental conditions.

In some examples, the electronic circuit further comprises a digital controller configured to alter the predetermined condition for the voltage. This digital controller may be altered in order to raise and/or lower the predetermined condition for the voltage and/or the voltage threshold. This may be advantageous in situations where the device is moved to different buildings and the area which is wished to be monitored by the device changes. In particular, a higher threshold voltage may be used for smaller monitoring areas and a lower threshold voltage may be used for larger monitoring areas. This may allow for a customizable device which is able to be altered depending on environmental conditions.

In some examples, the device further comprises an encryption unit configured to encrypt an output signal output by the device between the device and a network entity to which the device is connectable or coupleable within a network, wherein the output signal comprises a signal output by one or both of the alarm unit and the machine learning unit. The network may comprise a router and/or a server. The router and/or server may be the network entity. The router and/or the server may be configured to store and/or transmit the output signal of the device. In some examples, the output signal is a result from the electronic circuit and/or information from the machine learning unit which may relate to machine learning and/or a potential break-in and/or an indication form the alarm unit that the alarm has been triggered. The encryption unit may be configured to securely transmit results from the device to a secondary device such as, for example, a router and/or a server. This may allow for a secure security system. The encryption unit may use a commercially available method of encryption and/or a bespoke method of encryption.

In some examples, the encryption unit is configured to allocate a unique identifier to the device and to install an encryption certificate to the device. The identifier and certificate may be installed onto the device during setup of the device. In some examples, the device may then communicate only with other devices which have the same security certificate and/or has a whitelist with the unique identifier on it. This may allow for a secure security system.

In some examples, the device further comprises a connection testing unit configured to test a connection between the device and a network entity to which the device is connectable or coupleable within a network. This may allow for the device to detect if an unauthorized device is attempting to connect to the network. In some examples, if the device detects an unauthorized device attempting to connect to the network, the device may temporarily suspend transmissions to the router and/or trigger the alarm unit and/or notify the users. This may allow for a secure security system.

In some examples, the device further comprises a transceiver configured to communicate with a camera and/or a moving or stationary device equipped with sensors. The camera and/or moving or stationary device equipped with sensors may be activated if the alarm unit is activated and/or if the machine learning unit detects a noise consistent with a break-in. In some examples, the camera and/or moving or stationary device equipped with sensors may then transmit a video feed, via the device to an electronic device of a user so that the user can certify if there is a break-in occurring. In some examples, the moving or stationary device may be a drone or a robot. This may allow for a secure security system. In some examples, the alarm unit is configured to receive a video feed from the camera and/or the moving or stationary device equipped with sensors. This may allow for a secure security system.

In some examples, the machine learning unit is configured to be trained via publically available data sources and/or peer reports. This may allow for other devices in the area to transmit results to the device in order to detect if there are persons in the area breaking in to multiple buildings. Publically available data sources may comprises, for example, break-in reports, newswires, geographical location and neighborhood watch reports. This may allow for a secure security system.

In some examples, the machine learning unit is configured to analyze the detected noise and determine if the detected noise is a shock on a predefined part of a premise, in particular a door frame and/or a window frame, lasting less than a predefined period. The predefined period may be a predefined number of milliseconds, such as, for example, 100 ms or 500 ms. In some examples, the predefined period is 30 ms. In some examples, the predefined period is 300 ms. In some examples, the predetermined period is 3000 ms. The predefined number of milliseconds may be any number of milliseconds and may be set by a user and/or predetermined. This may further reduce the number of false-positives generated by the device and allow for a user to be notified as to where the break-in may be occurring. This may allow for a secure security system.

In some examples, the alarm unit is configured to output an audio alarm and/or a visual alarm and/or a notification to a user of the device. This may result in the break-in being prevented as the person wishing to break in may be deterred by the alarm. This may also allow for the user to be notified when a break-in is detected. This may allow for a secure security system.

In some examples, the alarm unit is configured to output the audio alarm and/or the visual alarm and/or send a notification to a user of the device and/or a monitoring surveillance company if the analyzed detected noise and/or the voltage satisfy a respective predetermined condition and/or if an unauthorized attempt to access the device is detected. This may result in the break-in being prevented as the person wishing to break in may be deterred by the alarm. This may also allow for the user to be notified when a break-in attempt is detected. In some examples, the alarm unit may be configured to output the alarm before the break-in occurs via the machine learning unit and the electronic circuit. This may allow for a secure security system.

In some examples, the alarm unit is configured to output the audio alarm and/or the visual alarm and/or send a notification to the user of the device if the connection between the device and the router is unsecure. This may result in the break-in being prevented as the person wishing to break in may be deterred by the alarm. This may also allow for the user to be notified when a break-in is detected. This may allow for a secure security system.

In some examples, the electronic circuit comprises at least two low-pass filters, at least three amplifiers and a comparator. This may allow for the electronic circuit to have a plurality of stages, wherein each stage further filters the noise detected by the microphone. This may thus reduce the unwanted noise and provide the machine learning unit and/or the frequency-to-voltage converter configured to convert a frequency into a voltage with a particularly clean signal, thereby improving the quality of the results and thereby reducing false positives. The term "clean" may be defined as when a high-amplitude, low frequency signal spike is above an ambient noise level of the area surrounding the device. The device may monitor the surrounding area at predetermined intervals, determined by the device and/or the user, and determine an ambient noise level comprising amplitude and frequency components, as a user moves about the premises. If the device detects a noise with an amplitude and/or a frequency outside of the ambient noise, the device may then arm and/or trigger the alarm unit.

In some examples, the comparator is configured to compare the voltage output by the frequency-to-voltage converter with a threshold voltage to determine whether the condition for the voltage is fulfilled. The comparator may compare the predetermined voltage threshold with the voltage output by the frequency-to-voltage converter configured to convert a frequency into a voltage. In some examples, if the voltage output by the frequency-to-voltage converter configured to convert a frequency into a voltage is above the threshold voltage, the processor and/or the memory of the alarm unit and/or the machine learning unit may decide that a break-in may be occurring.

In some examples, the electronic circuit and/or the machine learning unit are configured to use common false alarm rate, CFAR, detection and/or density-based spatial clustering of applications with noise, DBSCAN, clustering algorithms to analyze the received voltage signals and/or determine the alarm trigger. In some examples, the machine learning algorithm uses clustering algorithms with normalized template matching method, NTM, is configured to determine and identify the attempt of break-in. A CFAR clustering algorithm may allow for a target to be detected in a non-stationary background and in a multiple-target scenario. NTM may allow for the accurate sorting and classification of voltage spikes, which in turn may reduce the number of false alarms. In some examples, spiking cochlea models are used to improve classification of generated low frequency spikes and for audio waveform recognition. This may allow for an improvement in frequency spike classification and a reduction in the rate of false alarms. Any number of the above-mentioned methods may be used in the electronic circuit and/or the machine learning unit.

In some examples, the machine learning algorithm uses a random forest classifier and/or a recurrent neural network to train the machine learning unit. A random forest classifier may be advantageous over a neural network as the latter does not require GNU. This may result in an offline solution that is cheaper. A recurrent neural network can be used on the server to train the machine learning unit with respect to predictive break-in models. The usage of recurrent neural network may allow for a prediction model to be built based on time stamps, so the accuracy of the predictions can be increased. Combining a random forest classifier with a recurrent neural network may allow for an improved performance of various machine learning classifiers, thus improved accuracy in detection, prediction and further reduction of false alarms. In some examples, the electronic circuit comprises a switch coupled to a resistor comprised in the electronic circuit, and wherein a state of the switch is configured to alter the condition for the voltage. The switch may be coupled to a resistor, which in turn alters the threshold voltage and/or the predetermined condition. In some examples, there is a plurality of switches, wherein each switch is coupled to a resistor of a different value, thereby allowing for the threshold voltage to be altered by switching switches on and off. The switches may be switched on or off depending on the size of the area the device is monitoring, thereby altering the threshold voltage accordingly. In particular, a higher threshold voltage may be used for smaller monitoring areas and a lower threshold voltage may be used for larger monitoring areas. This may allow for a customizable device which is able to be altered depending on environmental conditions.

In some examples, there is only a single device. This may reduce consumer costs, production costs and allow for a more discrete device.

In some examples, the device is coupleable to an existing alarm system. This may allow for break-in detection in existing alarm systems to be improved. The device may be coupled to an existing alarm system by being coupled wiredly and/or wirelessly to the existing alarm system's central panels and/or by using connectivity over a server by using, for example, Rest API. In some examples, the coupling may be on a circuitry level i.e. one or more features of the device described above are integrated into the electronics of the existing alarm system.

In some examples, the machine learning unit comprises predictive premises break-in modeling configured to predict break-in time instances and locations and/or predictive data security break-in modeling configured to predict data security breaches. The predictive premises break-in modeling may be used for prediction of the break-in time instances and locations. The prediction may be based on machine learning modelling and may be based on the data points such as verified security alerts received from the device through the network, visual confirmations from surveillance cameras and moving or stationary device equipped with sensors installed in or near the premise, publicly available data sources such as break-in reports, newswires, having its geographical location, as well as neighborhood watch reports available through the web interface. The predictive data security break-in modeling may be based on the data points such as frequency of anomalies detected on the data blocks received from a single device location detected through performance of an unsupervised learning neural network accelerator logic and detected attacks to improve the security channel. The usage of predictive may allow for a user to be notified if a break-in is likely and/or allow for an alarm to be triggered before the break-in occurs.

According to a second aspect, we describe a device usable in particular for break-in prevention. The device comprises (only in some examples a transmitter configured to transmit ultra-wideband, UWB, signals) a receiver configured to receive UWB signals; an electronic circuit coupled to the (transmitter where a transmitter is comprised in the device, and to the) receiver, wherein the electronic circuit comprises a signal processing unit configured to process the (transmitted and) received UWB signals; a machine learning unit coupled to the electronic circuit, wherein the machine learning unit comprises a processor and a memory, wherein the processor is configured to identify an object based on the processed UWB signals using a machine learning algorithm stored in the memory; and an alarm unit configured to receive, from the machine learning unit, information on the identified object.

The receiver may be any suitable receiver that is configured to receive ultra-wideband, UWB, signals. In some examples, the receiver may be able to receive UWB signals in a plurality of UWB bands. In some examples, the receiver may be a receiver which is commercially available. In some examples, the transmitter and receiver may be combined into a transceiver. The transmitter and/or receiver and/or transceiver may be able to transmit and/or receive UWB signals from a second device. The UWB signals specified throughout the present disclosure may be UWB radio signals. In some examples, the transmitter and receiver may act as a radar system. In some examples, there may be no transmitter.

The electronic circuit is configured to analyze the received UWB signals. The electronic circuit may be coupled to any number of other components within the device. In some examples, the electronic circuit comprises a receiver antenna coupled to a microprocessor configured to process the received UWB signals. If the device comprises a transmitter, the transmitter and receiver may be two matched antennas coupled to the microprocessor, wherein the microprocessor processes the transmitted and received UWB signals. In some examples, the antenna is configured to transmit and/or receive signals through structures comprising of, for example, brick, wood, glass, plastic or any other material. In some examples, the electronic circuit comprises any type of UWB transmitter and/or receiver. In some examples, the electronic circuit comprises a processor and/or a microcontroller. In some examples, the UWB receiver and the processor and/or microcontroller are coupleable to each other and the receiver is configured to transmit a received signal to the processor and/or microcontroller. In some examples, the receiver is configured to transmit a received signal to a server, wherein the server is configured to process the received signal.

Throughout the present disclosure, the electronic circuit may be identical to (or may be configured to perform the same processing and/or functions as) a signal processing unit configured to process the received signals, wherein the signal processing unit is configured to, for example, detect a target and/or estimate a distance from the device to the target and/or track a target and/or track a distance of the target from the device and/or a velocity of the target. In some examples, the electronic circuit comprises the signal processing unit.

The machine learning unit comprises a processor and a memory and is configured to determine and identify an object based on the analyzed UWB signals and a machine learning algorithm. The memory may store one or more of the machine learning algorithms, previous results of the machine learning algorithm, and methods of machine learning. The processor may be configured to execute instructions stored by the memory. In some examples, the machine learning unit comprises a transceiver configured to transmit results from the machine learning unit and to receive updates to the machine learning algorithm. The machine learning may be supervised learning, unsupervised learning, semi-supervised learning, reinforcement learning, any other suitable type of learning or any combination thereof. The machine learning unit may be coupled to any number of other components within the device. In some examples, the machine learning unit is trained to detect a target and/or classify a target and/or track a target's behavior and/or trigger an alarm and/or calibrate to different environments. In some examples, the machine learning unit uses implementation of first approaches for presence sensing and/or feature extraction/engineering. In some examples, the machine learning algorithm detects an anomaly i.e. if an object is moving and then classifies the anomaly i.e. if the object is a person. The machine learning algorithm may implement a baseline approach for the detection and classification of a target and then improve on these via machine learning. In some examples, the detection of an anomaly may be based on a distribution of real and/or complex channel impulse response, CIR, values. In some examples, the detection comprises obtaining mean and standard deviation values over a predetermined period of time and classify values out with this boundary as anomalies. For classification, the machine learning algorithm may use a radar cross-section, RCS, to provide an indication of the size of the target and/or track a direction of movement of the target to predict the intention of the target. In some examples, the machine learning unit is trained in different environments to evaluate the reliability of the RCS via simple test measurements and measurements in specific environments over longer time periods. In some examples, a threatening target may change based on an environment. For example, wild animals may be detected as threats in a farmland environment but not in an urban environment. In some examples, the machine learning unit is able to detect objects through walls and/or doors and/or windows and/or any other structure. In some examples, the machine learning unit is configured to detect the presence of e.g. a human with a behavioral pattern different than those of the user of the device. A behavioral pattern may be, for example, a gait of a person, a walking speed of a person, a limb movement of a person or any other suitable characteristic, and any combination of the foregoing. In some examples, the presence of a human may be detected within a predetermined distance of the wall such as, for example, four meters. In some examples, the machine learning unit may not detect plants and/or leaves and/or animals and/or furniture and/or vehicles as threats in an urban environment. In some examples, the machine learning unit, and therefore threat detection ability, may be switched off by a user. In some examples, the machine learning unit may go into a sleep mode after a predetermined amount of time where no targets are detected. In some examples, a position of an intruder such as, for example, crawling, standing or crouching, or a human (or generally an intruder) who is carrying metal objects may be detected by the machine learning unit.

In some examples, the device does not comprise a machine learning unit and the electronic circuit is configured to process the received signals in order to, for example, detect a target and/or estimate a distance from the device to the target and/or track a target and/or track a distance of the target from the device and/or a velocity of the target.

In some examples, the device comprises the electronic circuit, wherein the electronic circuit is a signal processing unit configured to process the received signals, wherein the signal processing unit is configured to detect a target and/or estimate a distance from the device to the target and/or track a target and/or track a distance of the target from the device and/or a velocity of the target.

In some examples, the electronic circuit comprises a signal processing unit. The signal processing unit may then transmit the detection of the target and/or the estimation of the distance from the device to the target and/or the tracking of the target and/or the tracking of the distance of the target from the device and/or the velocity of the target to the machine learning unit. The machine learning unit may then be configured to analyze these inputs and determine and/or identify the target within a field of view of the device, as described in the present disclosure.

In some examples, the device does not comprise a machine learning unit. In this case, the device may further comprise a memory and a processor coupleable to the electronic circuit, wherein the memory is configured to store information suitable for a classification and/or an identification of an object, and wherein the processor is configured to execute instructions stored in the memory. The electronic circuit and/or the processor may be configured to process the received signal(s) in order to, for example, detect a target and/or estimate a distance from the device to the target and/or track a target and/or track a distance of the target from the device and/or a velocity of the target and/or identify a target. In this example, the memory is configured to compare the processed signal with one or more identifications and/or classifications stored in the memory and as a result, classify and/or identify the object. The memory may then send an instruction to the processor for execution by the processor, wherein the instruction comprises an arming and/or triggering of the alarm unit.

In some examples, the signal processing unit and the machine learning unit are in a single unit. In some examples, the signal processing unit is incorporated into the machine learning unit. This may allow for the machine learning unit to process the received signals and identify and/or classify the target based on the received processed signals. This may allow for a simpler device with reduced manufacturing and consumer costs.

Throughout the present disclosure, signal processing may therefore, in some examples, comprise applying machine learning to a detected or received signal. In some other examples, the signal processing may be performed separately from the machine learning application.

In some examples, the object detected and/or identified by the machine learning unit is a human and/or a human carrying a secondary object, wherein the secondary object is, for example, a metallic object such as a gun, a crowbar or a screwdriver, an animal, a tree or any other observable object. In some examples, the object is the target of the detection and/or identification carried out by the machine learning unit.

As outlined above, in some examples, machine learning is one method of signal processing. Signal processing may also be undertaken via a signal processing unit configured to have the same functions as the described machine learning unit and/or via any other suitable method of signal processing. The term "machine learning" can be understood as a method of signal processing throughout the present disclosure.

Throughout the present disclosure, the terms "object" and "target" may have the same meaning and may be interchangeable with one another.

In some examples, the machine learning unit and/or the electronic circuit and/or the signal processing unit is configured to detect and/or track and/or identify a plurality of targets simultaneously. This may be achieved via a plurality of electronic circuits and/or signal processing units and/or machine learning units, wherein each component detects and/or tracks and/or identifies a single target. In some examples, the machine learning unit and/or the electronic circuit and/or the signal processing unit is configured to track all targets at once.

In some examples, the electronic circuit and/or the signal processing unit and/or the machine learning unit are configured to detect and/or identify the target based on the velocity of the target.

The alarm unit is configured to receive information from the machine learning unit. The alarm unit may contain a processor and a memory. The memory may store predetermined conditions for activating the alarm unit. The processor may be configured to execute instructions stored in the memory.

In some examples, the device is configured to function without a coupling to the Internet. In this case, the device may be able to arm and/or trigger the alarm unit and/or classify an object and/or detect an intruder (e.g. human) without a coupling to the Internet. In some examples, the device is a stand-alone device not coupled to any other devices, such as a server nor to the Internet. In some examples, the device is coupleable to a physical server and/or a cloud server, wherein the physical server and/or the cloud server is configured to receive results from the device. In some examples, the coupling is via a wired and/or wireless router and/or mobile network. In some examples, if the device detects an interruption in the network, the device switches to a different network. As a non-limiting example, if the device detects an interruption in the wired coupling to the router, the device may then switch to a wireless coupling to the router or to the mobile network so as to ensure that there is a coupling to the physical server and/or the cloud server. In some examples, the device comprises a battery in case of a power outage. In some examples, the device notifies a user if there is a power outage. This may allow for a secure storage of device results in a separate location. In some examples, the device is coupled to Internet using mobile network.

In some examples, the device is embeddable in the router or any other suitable (stationary or mobile/moving) device. This may allow for a discrete device. The router or any other suitable (stationary or mobile/moving) device may comprise any number of the components mentioned in relation to the device. In this example, the device may comprise a circuitry board configured to comprise sound filtering similar to the electronic circuit described in this disclosure as well as a microphone and design common pins configured to be coupled to the pins of circuitry board of any router.

In some examples, a metric relating to a building where the device is located is stored in the memory. This memory is preferably the memory of the machine learning unit but may be a separate memory unit. This metric may be an area of the building, a material from which the building is built from, type of walls, a thickness of a wall, a type of window frames, a type of glass installed, a number of people who are expected within the building, a fixed object with defined 3D positioning such as, for example a painting or a safe, a number of doors and/or windows within the building or any other suitable metric regarding the building or a combination thereof. This may allow for a customizable device that is able to be altered depending on environmental conditions.

In some examples, the alarm unit is configured to trigger an alarm if the identified object satisfies a predetermined condition. The predetermined condition may be based on information received from the machine learning unit. The information may relate to whether an object has been detected within the field of view of the device. The predetermined condition may relate to whether an unauthorized person is within the field of view of the device. The machine learning unit may learn various movements which are associated with a person who regularly uses the building such as, for example, gait, walking speed and recognizable features. A movement may be defined as a difference between two points within the field of view of the device. The movement detection may also comprise a time stamp of a movement and/or a usage of Doppler and/or Micro-Doppler effects to determine the movement of a limb of a possible intruder. If the machine learning unit detects a person which does not conform to the known movements of a person who regularly uses the building, the alarm unit may send a notification to the known person to confirm if the person is authorized or not i.e. if the unknown person is allowed to be in the building. In some examples, the machine learning unit may be further trained to detect if a person is holding a metallic object.

In some examples, the device further comprises an encryption unit configured to encrypt an output of the device between the device and the router (or other network entity). The encryption unit may be configured to securely transmit results from the device to a secondary device such as, for example, a router or a server. This may allow for a secure security system. The encryption unit may use a commercially available method of encryption and/or a bespoke method of encryption.

In some examples, the encryption unit allocates a unique identifier to the device and installs an encryption certificate to the device. The identifier and certificate may be installed onto the device during setup of the device. In some examples, the device may then communicate only with other devices which have the same security certificate and/or has a whitelist with the unique identifier on it. This may allow for a secure security system.

In some examples, the device further comprises a connection testing unit configured to test a connection between the device and the router (or other network entity). This may allow for the device to detect if an unauthorized device is attempting to connect to the network. In some examples, if the device detects an unauthorized device attempting to connect to the network, the device may temporarily suspend transmissions to the router and/or trigger the alarm unit. This may allow for a secure security system.

In some examples, the device further comprises a transceiver configured to communicate with a camera and/or a moving or stationary device equipped with one or more sensors. In some examples, the moving or stationary device may be a drone and/or a robot. The camera and/or moving or stationary device equipped with sensors may be activated if the alarm unit is activated and/or if the machine learning unit detects a noise consistent with a break-in. In some examples, the camera and/or moving or stationary device equipped with sensors may then transmit a video feed, via the device to an electronic device of a user so that the user can certify if there is a break-in occurring. This may allow for a secure security system. In some examples, the alarm unit is configured to receive a video feed from the camera and/or the moving or stationary device equipped with sensors. This may allow for a secure security system.

In some examples, the machine learning unit is configured to be trained via publically available data sources and/or peer reports. This may allow for other devices in the area to transmit results to the device in order to detect if there are persons in the area breaking into multiple buildings. Publically available data sources may comprise, for example, break-in reports, newswires, geographical location and neighborhood watch reports. This may allow for a secure security system.

In some examples, the alarm unit is configured to output an audio alarm and/or a visual alarm and/or a notification to a user of the device. This may result in the break-in being prevented as the person wishing to break in may be deterred by the alarm. This may also allow for the user to be notified when a break-in is detected. This may allow for a secure security system.

In some examples, the alarm unit is configured to output the audio alarm and/or the visual alarm and/or sends a notification to the user of the device the determined object is consistent with an unauthorized person. This may result in the break-in being prevented as the person wishing to break in may be deterred by the alarm. This may also allow for the user to be notified when a break-in is detected. This may allow for a secure security system.

In some examples, the alarm unit is configured to output the audio alarm and/or the visual alarm and/or send a notification to the user of the device if the connection between the device and the router (or other network entity) is unsecure. This may result in the break-in being prevented as the person wishing to break in may be deterred by the alarm. This may also allow for the user to be notified when a break-in is detected. This may allow for a secure security system.

In some examples, the effective field of view of the device is more than 120°. In some examples, the effective field of view of the device is more than 160°. In some examples, the effective field of view of the device is 180°. This may allow for a device which can monitor a wide angle i.e. field of view, therefore improving the security of the building as there are fewer blind spots.

In some examples, the machine learning unit is configured to determine a position and/or an object size and/or a direction of movement and/or a velocity of the identified object and/or a metal object being carried by the object and/or an intention of the object based on the processed UWB signals. This may allow for the machine learning unit to learn various movements which are associated with a person who regularly uses the building such as, for example, gait, walking speed and recognizable features and/or an object which may periodically be within the field of view of the device. The term "intention" may mean that the machine learning unit determines if the object is likely to perform a break-in and/or be a threat to the premises. The may also allow for the machine learning unit to detect an intention of the object based on, for example, a movement, a velocity, a direction and/or a tracking of the object. If the machine learning unit detects that the object is carrying a metal object, the machine learning unit may detect that the object is a threat. If the machine learning unit detects a person which does not conform to the known movements of a person who regularly uses the building, the alarm unit may send a notification to the known person to confirm if the person is authorized or not i.e. if the unknown person is allowed to be in the building. This may also reduce the chance of false positives.

In some examples, the receiver is configured to receive UWB signals through objects such as doors, windows and walls. This may allow for the device to be placed inside a building while the device monitors the outside of a building. This may allow for the building to be monitored in a discrete manner.

In some examples, the transmitter and/or receiver is configured to be embeddable in a moving or stationary device equipped with one or more sensors. The moving or stationary device can be, for example, a robot or a drone. This may allow for the transmitter and/or receiver to be placed by the user in locations where it is most needed. This may also allow for a versatile device configured to detect intruders.

In some examples, if a transmitter and a receiver are on a single device and are configured to act as a transceiver. In some examples, the transmitter and receiver are placed next to each other on the same board. This may allow for a device which requires only a single device as opposed to a transmitter device and a receiver device. This may reduce production and consumer costs, and allow for a more discrete device.

In some examples, the machine learning unit is configured to determine Doppler and Micro-Doppler velocity measurements based on the analyzed UWB signals. This may allow for the device to determine a velocity of the object within the monitoring range. If the object is a person, it may also allow for separate parts of the person to be monitored. For example, arm and/or leg movements which may indicate if the person is trying to break in to the building.

In some examples, the transmitter and/or receiver is configured to transmit and/or receive one or more pseudo-random noise, PRN, codes. This may allow for the resolution of the radar and the Signal-to-Jam-Ratio (S/J) to be improved. This may in turn allow for the receiver and/or the machine learning unit to receive clearer inputs, thereby improving the accuracy of the detection of objects within the monitoring field of the device.

In some examples, the electronic circuit is configured to evaluate an autocorrelation function based on the received PRN codes. This may allow for the receiver or transceiver and/or the electronic circuit and/or the machine learning unit to receive clearer inputs, thereby improving the accuracy of the detection of objects within the monitoring field of the device.

In some examples, the electronic circuit and/or the machine learning unit are configured to use common false alarm rate, CFAR, detection and/or density-based spatial clustering of applications with noise, DBSCAN, clustering algorithms to analyze the received UWB signals and/or determine and identify the object. In some examples, these algorithms may be used to determine the alarm trigger. This may allow for a device configured to detect objects through structures such as, for example, walls, doors and windows. In some examples, the machine learning algorithm uses clustering algorithms with normalized template matching method, NTM, and/or is configured to determine and identify the attempt of break-in. CFAR clustering algorithm may allow for a target to be detected in a non-stationary background and in a multiple-target scenario. NTM may allow for the accurate sorting and classification of voltage spikes, which in turn may reduce the number of false alarms. In some examples, spiking cochlea models are used to improve classification of generated low frequency spikes and for audio waveform recognition. This may allow for an improvement in frequency spike classification and a reduction in the rate of false alarms.

In some examples, the machine learning algorithm uses a random forest classifier and/or a convolutional neural network to train the machine learning unit. A random forest classifier may be advantageous over a neural network as the latter does not require GNU. This may result in an offline solution that is cheaper. A recurrent neural network can be used on the server to train the machine learning unit with respect to predictive break-in models. The usage of recurrent neural network may allow for a prediction model to be built based on time stamps, so the accuracy of the predictions can be increased. Combining a random forest classifier with a recurrent neural network may allow for an improved performance of various machine learning classifiers, thus improved accuracy in detection, prediction and further reduction of false alarms. A combination of CFAR and random forest classification may allow for an improved accuracy in detection of targets and a reduced rate of false alarms.

In some examples, the device comprises a plurality of transmitters and/or receivers and/or transceivers located at a plurality of separate locations. This may allow for the device to monitor several areas in the building such as, for example, multiple doors and/or windows simultaneously while allowing for there to be a single electronic circuit and machine learning unit. In some examples, there are multiple transmitters and/or receivers and/or transceivers and electronic circuits and a single machine learning unit. As there are multiple transmitters and/or receivers and/or transceivers, this may improve the security of the building.

In some examples, the electronic circuit and/or the machine learning unit are configured to measure a channel impulse response, CIR, based on the received UWB signals. The CIR may allow for the device to detect objects within the monitoring range of the device. The CIR may allow for the device to detect objects which are permanently within the monitoring range such as, for example, trees and flowers. The CIR may allow for the device to detect a distance of an object from the device and/or a size of an object.

In some examples, a reference CIR is measured. This may allow for the device to determine objects within the monitoring range but are not an unauthorized person such as, for example, cars, trees and furniture. The reference CIR may refer to a "natural" state of the monitoring area, i.e. a state in which there are no unidentified and/or unauthorized objects. The reference CIR may be measured several times in order to improve the certainty that objects within the monitoring range of the device are not unauthorized objects. In some examples, a plurality of reference CIRs are measured, and each reference CIR is configured to be measured at a predetermined interval. The interval may be predetermined by the device and/or determined by a user of the device. In some examples, reference CIRs are measured e.g. every 20 minutes, every hour or every 2 hours (for example in predefined intervals). In some examples, the reference CIR(s) is (are) split into segments increasing in distance from the transmitter and/or receiver of the device. In a non-limiting example, the reference CIR may contain responses at e.g. 20-centimeter intervals (or 1, 2, 3, . . . 19 cm intervals) from the transmitter and/or receiver. This may allow for a particularly detailed reference CIR, thereby improving object detection and/or identification should an object enter the field of view of the device. In some examples, the distance intervals are predetermined by the device and/or by the user of the device.

In some examples, the device measures a test CIR. A test CIR may be a CIR which is measured at any point in time to give a snapshot of the monitoring area at any given moment.

In some examples, the electronic circuit and/or the machine learning unit are configured to process (i) a plurality of reference CIRs obtained previously in time, wherein the reference CIRs are aligned in time, and (ii) a test CIR measured at a current point in time. The reference and test CIRs may be in accordance with the CIRs described above and throughout this disclosure.

A reference CIR may be defined as a CIR measured without a target in the surveillance area, characterizing the structure of the area by received signal parts of the transit signal at different arrival times. Hence, there may be a training phase in which the device gathers these CIRs. This training phase may, in some examples, be repeated from periodically. In some examples, this repeating period is four hours, 30 minutes or any other period determined by a user and/or predetermined by a manufacturer. In some examples, no target movement is included in the reference CIR. This may then be used to identify suitable CIRs which should be part of the reference CIRs; that means, CIRs in which movement of a person is detected may not be used as a reference CIR.

A test CIR may be defined as a CIR measured to find out if a target is inside the surveillance area and/or field of view of the device. This may mean that after the training to collect and analyze reference CIRs, all measured CIRs thereafter may be considered test CIRs.

In the current implementation this signal processing steps are not included in the ML part. They can be supported by ML. This signal processing will typically be done in a processor or microcontroller which are part of the security device.

In some examples, the machine learning unit is configured to compare one or more of the plurality of reference CIRs and the test CIR, and wherein the machine learning unit is configured to identify an object based on a difference between the compared one or more of the plurality of reference CIRs and the test CIR. This may allow for the machine learning unit to determine if there are any unauthorized objects within the monitoring range of the device. The machine learning unit may be able to determine additional objects which produce an additional scattering pattern and/or the lack of a scattering pattern from objects within the reference CIR. The comparison may be a cross correlation of the reference CIR and the test CIR. Additionally or alternatively, a processor and/or a microcontroller in the electronic circuit is configured to analyze and/or compare the plurality of reference CIRs with the test CIR.

Each test CIR (or a group of several test CIRs) may be compared to the reference CIR(s). In some examples, the structure of both test CIR(s) and reference CIR(s) are compared by a correlation analysis. The difference between the test CIR(s) and the reference CIR(s) may then be evaluated based on an adaptive threshold. In some examples, an adaptive threshold may be based on a standard deviation of the observed reference(s) of the reference CIR(s). As a non-limiting example, example, a new arriving target may add a strong reflection which is present in the test CIR but was not present in the reference CIR. This may then lead to a reduced correlation result at the distance where the new reflection (caused by the target) is visible. Additionally, in some examples, a target resulting in the new reflection, inside the test CIR(s), may exceed the adaptive threshold. Resultantly, a detection of a target may then be declared by the electronic circuit and/or the signal processing unit and/or the machine learning unit. In some examples, the adaptive threshold is based on continuous learning and/or partially continuous learning by the machine learning unit. In some examples, the machine learning unit may alter the adaptive threshold based on the received processed signals and/or via updates which may be downloaded by the machine learning unit by a wired and/or wireless coupling to the Internet.

In some examples, the reference and/or the test CIR may be based on a time of flight measurement. This may allow for the device to determine how far away an object is from the device.

In some examples, the transmitter and/or the receiver is configured to reduce the radio interference from objects proximate to the transmitter and/or the receiver. The proximate distance may be defined as a distance from 0 cm to 100 cm. The reduction in radio interference may be achieved via impedance matching. A reduction in radio interference from proximate objects may result in an improved antenna efficiency and an improved and more accurate measurement of the CIR.

In some examples, the machine learning unit is configured to detect a change in distance of an object over time. This may allow for the machine learning unit to determine if an object is staying at a constant distance from the device i.e. a passer-by or whether the object is getting closer to the device i.e. a possible unauthorized person. This may reduce the false positive rate of the device.

In some examples, the transmitter and/or the receiver is a patch antenna. This may allow for a more discrete and smaller device. This may improve the security of the building as an unauthorized person may not see the device and/or it may allow for a user of the device to discretely hide the device.

In some examples, the patch antenna is linearly polarized with wide radiation pattern. The term "wide" may be defined as more than 120°, preferably more than 160° and most preferably, 180°. This may be advantageous for concentrations of UWB frequencies in a narrow range. This may result in the device being able to be placed in different locations such as, for example, near a ceiling or near the floor, and not to lose clarity in the received UWB signals and/or detection rates. The antenna may alternatively be any other suitable type of antenna.

In some examples, the patch antenna may be characterized by being optimized such that:
  (i) the influence of the wall (or door or window) in the near field does not significantly reduce the efficiency of the antennas,
  (ii) the reflection of the wall is reduced in both the transmission and receiving phases,
  (iii) they support the large UWB bandwidth, and
  (iv) the antenna pattern supports the radar setup, i.e. high antenna gain towards the wall, and reduced directivity away from the wall.

In some examples, the antenna is configured to be placed facing a wall. In some examples, the antenna is configured to be placed a predetermined number of millimeters such as, for example, 1 mm, 2 mm, 3 mm, . . . , 10 mm away from the wall while simultaneously facing the wall. In some examples, the wall may be a door, a window frame or any other part of a structure. In some examples, the antenna is configured such that it can be placed as any place upon the wall such as, for example, near a floor or near a ceiling.

The above may allow for the antenna to a radiation pattern wide enough allow for the detection and/or identification behind the wall and while also preventing the detection and/or identification of objects on the same side of the wall as the antenna. The above may allow for a device which can monitor a wide (e.g. more than 120°, preferably more than 160° and most preferably, 180°) angle i.e. a wide field of view, thereby improving the security of the building as there are fewer blind spots. The above may also allow for the device to reject near-field interference, thereby allowing for an improved detection and/or identification of an object behind the wall. It may also allow for two antennas to be placed millimeters from each other due to the rejection of interference and/or any of the above explained features and/or advantages.

According to a third aspect, we describe a system in particular for break-in prevention, comprising the device according to the first aspect and the device according to the second aspect, wherein the devices are coupled via an encrypted connection.

In some examples, a result from the device according to the first aspect and/or the device according to the second aspect is communicated to a server and/or a router and/or other suitable (stationary or mobile/moving) device. In some examples, the encrypted connection is the same encrypted connection as described above.

It is clear to a person skilled in the art that the statements set forth herein may be implemented under use of hardware circuits, software means, or a combination thereof. The software means can be related to programmed microprocessors or a general computer, an ASIC (Application Specific Integrated Circuit) and/or DSPs (Digital Signal Processors). For example, the processing unit may be implemented at least partially as a computer, a logical circuit, an FPGA (Field Programmable Gate Array), a processor (for example, a microprocessor, microcontroller (µC) or an array processor)/a core/a CPU (Central Processing Unit), an FPU (Floating Point Unit), NPU (Numeric Processing Unit), an ALU (Arithmetic Logical Unit), a Coprocessor (further microprocessor for supporting a main processor (CPU)), a GPGPU (General Purpose Computation on Graphics Processing Unit), a multi-core processor (for parallel computing, such as simultaneously performing arithmetic operations on multiple main processor(s) and/or graphical processor(s)) or a DSP.

Even if some of the features described above have been described in reference to the device according to the first aspect, these features may also be in reference to the second and/or third aspects and vice versa. These aspects may also apply to a method for break-in prevention.

BRIEF DESCRIPTION OF THE DRAWINGS

These and other aspects of the invention will now be further described, by way of example only, with reference to the accompanying figures, wherein like reference numerals refer to like parts, and in which.

DETAILED DESCRIPTION OF THE INVENTION

Figure 1:
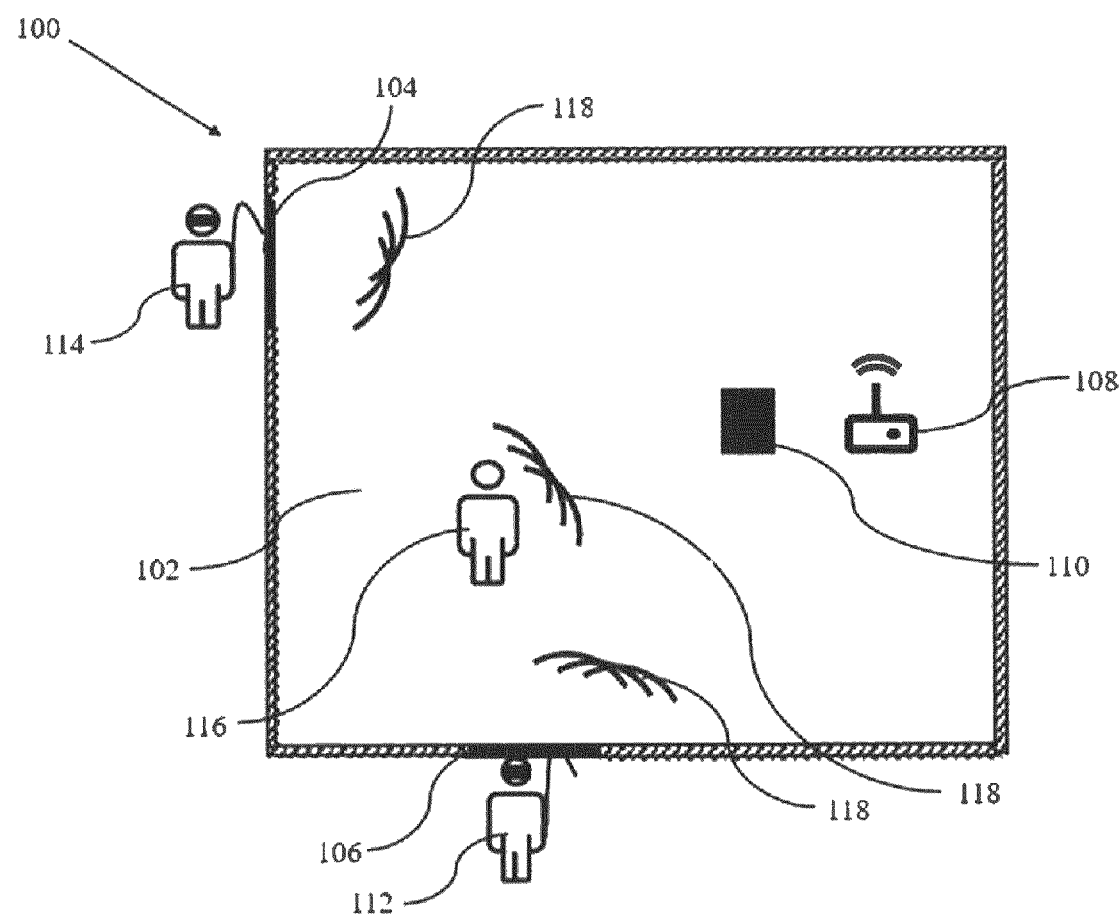
FIG. 1 shows a schematic diagram of a device for break-in prevention and a possible break-in according to some examples as described herein.

FIG. 1 shows a schematic diagram of a device for break-in prevention and a possible break-in according to some examples as described herein.

An example of the present disclosure is described with reference to FIG. 1. FIG. 1 illustrates a basic schematic diagram of the device located inside of a house or business establishment 100, wherein the device 110 is configured to analyze vibrations 118 generated by noise. A screening process and intelligence may be embedded in the device 110 and may work independently of any other device.

As shown in FIG. 1, the break-in security system device 110 is placed within a building or business premise 100 in this example in a room 102. The building or business premise 100 in which the break-in security system device 110 is installed, has windows, doors or other entry points 104, 106 for break-in. The device 110 is an intelligent device and a screening process and intelligence is embedded in the device 110. The device 110 can work independently of a server and without help of any other device such as, for example, a controller. In one example, to ensure proper coverage on one or several floors, a central placement of the device 110 is recommended. The door 104, window 106 and other users 116 within the premises cause vibrational waves 118, e.g. in the form of sound, which are detected by the device 110. A first person 114 forces the door 104 with an attempt to enter the premises 100 and a second person 112 forces the window 106 with an attempt to enter the premises 100, thus causing vibrational waves 118. Movement caused by the user 116 in the premises 100 also causes vibrational waves 118. The device 110 detects the vibrational waves 118 and screens the vibrations, as will be described in more detail below.

The device 110 is wirelessly and/or wiredly coupled to a router 108 present within the premises 100 where the device 110 is installed. Through the router 108, the device 110 is connected to the Internet and is connected to a cloud-based computing device and/or a server located within the premises 100 or outside of the premises. The device 110, in addition to screening sound vibrations 118, also constantly analyses internet network strength, availability and security. In some examples, the device 110 also analyzes the internet network strength, availability and security at a rate determined by the device and/or by the user 116. In case of lack of connectivity or security breach, the device 110 switches to another available network, to ensure constant connection with the cloud-based computing machine and/or the server located within the premises 100 or outside of the premises. The device 110 may also be coupled to the Internet using a mobile network. The device 110 may comprise a backup battery and in the case of a router and/or power failure, the device 110 may then switch to the mobile network.

The device 110 is allocated a unique identifier, generated during the configuration process of the device 110. An encryption certificate is also installed in the device 110 at the same time to allow security alerts to be transmitted by the encrypted channel. In some examples, only an identifier or an encryption certificate is installed onto the device 110 during the configuration process. In some examples, the unique identified and/or the encryption certificate is installed onto the device after the configuration process. The device 110 can be easily configured by a user 116 by inputting the configuration setting on a companion smartphone application which may connected to the cloud and/or a server as well. The configuration settings are incorporated into the device 110 and the device 110 works in accordance with the policies set by the user 116. In some examples, there may also be a display upon the device 110 with which the user 116 can alter the configuration settings.

The device 110 contains a processor (see FIG. 2) to control the operations of the device 110 and a memory (see FIG. 2) which stores the detected information, such as noise and data from the vibrational waves 118, configuration settings and also the instructions which are executed by the processor. The transceiver (see FIG. 2) of the device 110 provides both wired and wireless communication capabilities to communicate to the Internet and cloud-based computing machines. The device 110 can continuously be in communication with the internet and other remote-control devices for additional features.

To ensure proper coverage on one or several floors of premises 100, a central placement of the device 110 within the premises 100 is particularly advantageous. Set up and control of the device 110 may be made by the usage of a mobile app and/or via a display upon the device 110. The alarm may be verified by applying a challenge response protocol as soon as a possible break-in is detected. The protocol may be based on the 802.15.4 UWB, Wi-Fi, Bluetooth®, communication protocol, or a smartphone, laptop, desktop computer or other device.

Figure 2:
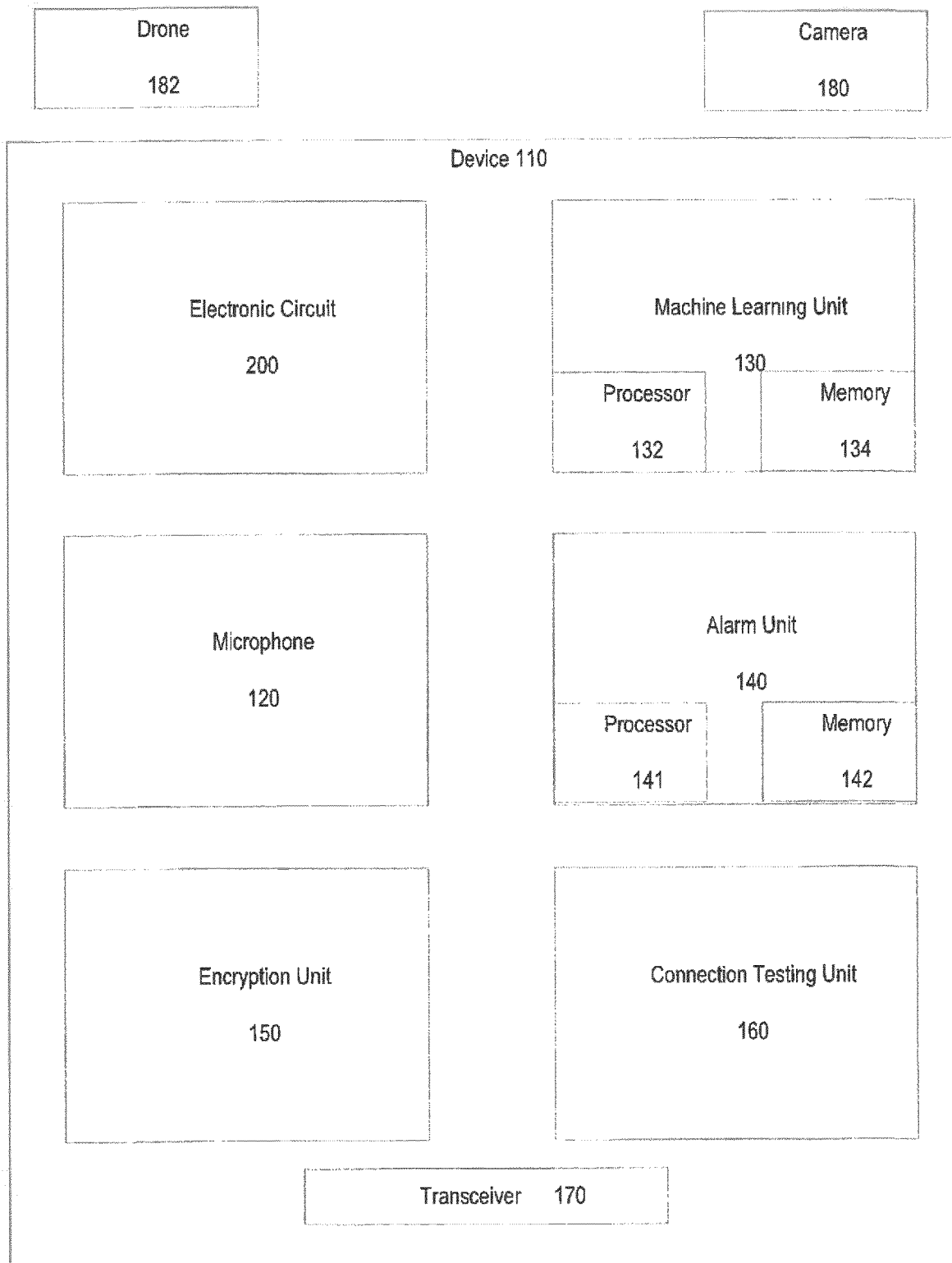
FIG. 2 shows a schematic diagram of the device according to some examples as described herein.

FIG. 2 shows a schematic diagram of the device according to some examples as described herein.

The device 110 comprises a microphone 120, a machine learning unit 130 comprising a processor 132 and a memory 134, an alarm unit 140, an encryption unit 150, a connection testing unit 160, a transceiver 170 and an electronic circuit 200.

The microphone 120 may be any suitable microphone 120 that is configured to detect noises and/or vibrational waves 118 in the human inaudible range. Additionally or alternatively, the microphone 120 is configured to detect noises with frequencies in the human audile range. Additionally or alternatively, the microphone 120 may be able to detect noises with frequencies which are above the human audible range. In some examples, the microphone 120 may have an operational frequency of 20 to 16000 Hertz. In some examples, the microphone 120 may have an operational frequency of below 20 Hertz. In some examples, the microphone 120 may be a microphone 120 which is commercially available.

The microphone 120 may then be coupled to the machine learning unit 130. The machine learning unit 130 comprises a processor 132 and a memory 134 and is configured to analyze the detected noise based on a machine learning algorithm. The memory 134 may store one or more of the machine learning algorithm, previous results of the machine learning algorithm, and methods of machine learning. The processor 132 may be configured to execute instructions stored by the memory 134. In some examples, the machine learning unit 130 comprises a transceiver (not shown) configured to transmit results from the machine learning unit 130 and to receive updates to the machine learning algorithm. The machine learning may be supervised learning, unsupervised learning, semi-supervised learning, reinforcement learning, any other suitable type of learning or any combination thereof. The machine learning unit 130 may be coupled to any number of other components within the device 110. The machine learning unit may be informed by a user 116 of the device 110 about a metric of the area the device 110 is configured to monitor. This metric may be an area of the building, a material from which the building is built from, a number of people who are expected within the building, a number of doors and/or windows within the building, any other suitable metric regarding the building or a combination thereof. This may allow for the machine learning unit 130 to better understand the area which it is monitoring and reduce the false-positive rate of the identification of unauthorized persons and/or objects.

In some examples, the machine learning algorithm uses a random forest classifier and/or a recurrent neural network to train the machine learning unit 130. A random forest classifier may be advantageous over a neural network as the latter does not require GNU. This may result in an offline solution that is cheaper. A recurrent neural network can be used on the server to train the machine learning unit 130 with respect to predictive break-in models. The usage of recurrent neural network may allow for a prediction model to be built based on time stamps, so the accuracy of the predictions can be increased. Combining a random forest classifier with a recurrent neural network may allow for an improved performance of various machine learning classifiers, thus improved accuracy in detection, prediction and further reduction of false alarms.

The alarm unit 140 is configured to receive a result from the machine learning unit 130 and an output from the electronic circuit 200 which will be described in more detail below. The alarm unit may contain a processor 141 and a memory 142. The memory may store predetermined conditions for activating the alarm unit. The processor may be configured to execute instructions stored in the memory. In some examples, the alarm unit 140 is triggered if the noise analyzed by the machine learning unit 130 is consistent with a break-in and/or if the output of the electronic circuit 200 is above a predetermined threshold, as will be described below. In some examples, when the alarm unit 140 is triggered, the alarm unit 140 outputs an audio alarm and/or a visual alarm and/or a notification to a user 16 of the device 110.

The device 110 further comprises an encryption unit 150 configured to encrypt an output of the device 110 between the device and the router 108. The encryption unit 150 may be configured to securely transmit results from the device 110 to a secondary device such as, for example, a router 108 or a server. This may allow for a secure security system. The encryption unit 150 may use a commercially available method of encryption and/or a bespoke method of encryption. In some examples, the encryption unit 150 allocates the unique identifier to the device 110 and installs an encryption certificate to the device 110, as described above. The identifier and certificate may be installed onto the device 110 during setup of the device 110. In some examples, the device 110 may then communicate only with other devices which have the same security certificate and/or has a whitelist with the unique identifier on it. This may allow for a secure security system.

The device 110 further comprises a connection testing unit 160 configured to test a connection between the device 110 and the router 108. This may allow for the device 110 to detect if an unauthorized device is attempting to connect to the network. In some examples, if the device 110 detects an unauthorized device attempting to connect to the network, the device 110 may temporarily suspend transmissions to the router 108. This may allow for a secure security system. In some examples, the alarm unit 140 is triggered when the connection is determined to be unsecure.

The device 110 further comprises a transceiver 170 configured to communicate also with a camera 180 and/or a moving or stationary device equipped with sensors 182 and/or an existing alarm and/or an existing access control panel. The device 110 may be coupled to an existing alarm system by being coupled wiredly and/or wirelessly to the existing alarm system's central panels and/or by using connectivity over a server by using, for example, Rest API. In some examples, the coupling may be on a circuitry level i.e. one or more features of the device described above are integrated into the electronics of the existing alarm system. The camera 180 and/or moving or stationary device equipped with sensors 182 may be activated if the alarm unit 140 is activated and/or if the machine learning unit 130 detects a noise consistent with a break-in. In some examples, the camera 180 and/or moving or stationary device equipped with sensors 182 may then transmit a video feed, via the device 110 to an electronic device of a user 116 so that the user 116 can certify if there is a break-in occurring. The alarm panel and/or access control panel can by any commercially available panel, that is compatible with the device 110 and may trigger scenarios, such as, in the case of an alarm, a trigger siren and in the case of access, verification of the status of door locks. This may allow for a secure security system. In some examples, the alarm unit 140 is configured to receive a video feed from the camera 180 and/or the moving or stationary device equipped with sensors 182. This may allow for a secure security system.

The transceiver 170 may be further configured to receive signals from the door or window sensors, panic buttons, remote controls or the like via wired and/or wireless means. In the case of door or window sensors, the sensors may be magnetic sensors configured to complete a circuit when the doors or windows are closed. The circuit may be configured to send a signal to the transceiver when the door or window is opened i.e. when the circuit is open. The transceiver 170 may then in turn send the signal to the device 110, which may trigger an audible signal and/or any other suitable type of alarm. A panic button may be coupled to the device 110 via wired and/or wireless means. In the case of a panic button being pressed, a signal may be transmitted to the transceiver 170 and in turn, the device 110 may trigger the alarm. A remote control may send a signal to the transceiver 170 to turn the device 110 on or off. The device 110 can also be turned on/off using an app or a web interface (not shown).

In some examples, there are multiple microphones 120. In this case, all received audio signals may be transmitted to a single electronic circuit 200. In some examples, there are multiple electronic circuits 200 coupled to the multiple microphones 120 and the outputs from the electronic circuits 200 are transmitted to a single machine learning unit 130.

Figure 3:
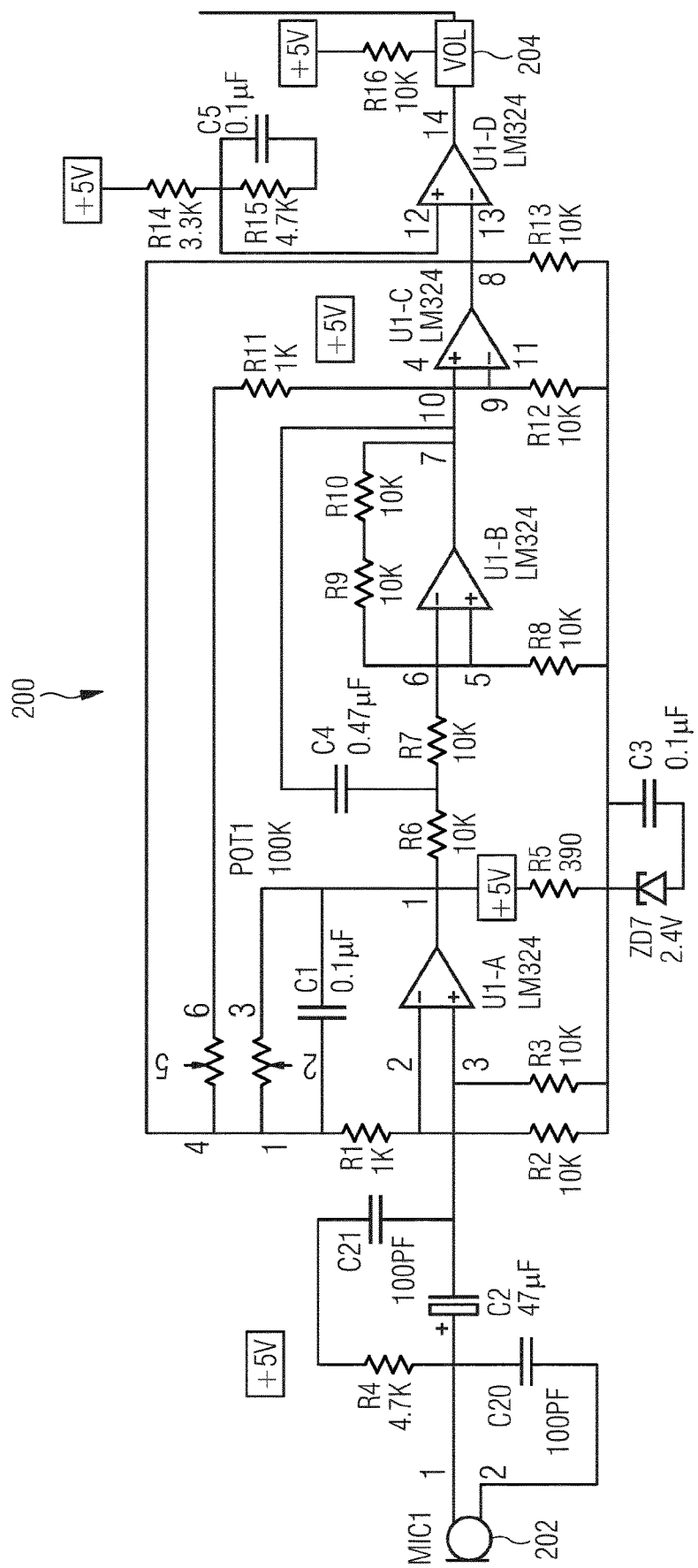
FIG. 3 shows an electronic circuit within the device according to some examples as described herein.

FIG. 3 shows an electronic circuit within the device according to some examples as described herein.

Figure 9:
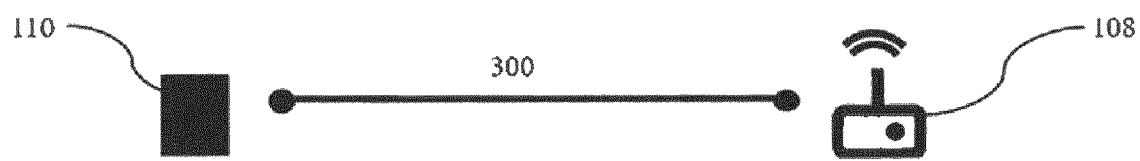
FIG. 9 shows a coupling between the device and a router according to some examples as described herein.

The electronic circuit 200 of the device 110, as depicted in FIG. 3, screens noise vibrations/vibration waves 118 prior to being classified by a processor 132 of the machine learning unit 130. The classification may lead to a positive break-in detection trigger and alarm verification, as depicted in the flowchart of FIG. 9, as will be described in more detail below.

FIG. 3 illustrates a circuit diagram which filters the noise and/or vibrational waves 118 detected by the microphone 120, 202 through a filtering circuit to deliver the high-amplitude low frequency signal spikes, largely free of impurities, for further signal treatment. The electronic circuit 200 is present in the device 110 installed in the premises 100 and the circuit 200 screens noise vibrations before the output is analyzed by the machine learning unit 130 and/or a processor of the device 110, thusly ensuring correct break-in detection trigger and alarm generation. The electronic circuit 200 receives the input sound vibrations from the microphone 202 and the circuit 200 comprises capacitors, resistors, low-pass filters and Op-Amps which work in conjunction to remove unwanted audio frequencies and other impurities from the incoming sound vibrations and produces clear sound signals (in a form of high-amplitude low frequency signal spikes) from the output port 204. In this way, the circuit 200 gives specific spikes and wavelengths to the processor of the device 110 for processing and classification as a positive or a negative break-in detection as per the machine learning algorithms stored in the memory 134 of the device 110. The working of the components of the circuit 200 is well known in the art and thus is not described in great detail herein. The electronic circuit shown 200 is merely an example. There may be any number of capacitors, resistors, Op-Amps, (low-pass) filters or any other electronic component within the electronic circuit 200. The values shown for the various electronic components are merely examples and the skilled person understands that any of these components may be changed for components with higher or lower values depending on the use of the device 110. The microphone 202 shown in the electronic circuit 200 is preferable the same microphone 120 as mentioned above in relation to FIG. 2. In the electronic circuit 200, the amplifiers may be of a variable gain.

As described above, a single device 110 is placed ideally centrally in an observation area. The observation area is the area for which the device 110 is monitoring and observing for audio and/or vibrational waves 118. Due to this, the device 110 can be placed in indoors or outdoors.

As described above, a single device 110 can be integrated in the router or any other suitable (stationary or mobile/moving) device.

The user 116 sets up the observation area. The observation area may be defined by either a simple regulator in a form of control knob or jumper fitted on the device 110 (see FIG. 3) or by a software logic embedded in a processor 132 or memory 134 of the device 110 or using the mobile application (see FIGS. 4 to 6). Where the software logic is used, a mobile application may be used to set the observation area. The user 116 may be asked simple questions, such as— "what is the furthest distance from the door/window and the sensor?", or "what is the detection perimeter in square meters?" In this scenario, the distance from furthest single detection point from the device 110 is detected and this is the basis of the observation area. These questions may be asked in conjunction with common false alarm rate, CFAR, detection and/or density-based spatial clustering of applications with noise, DBSCAN, clustering algorithms being used in the machine learning unit 130. These questions may then in turn set a size of an observation area.

In the example of FIG. 3, the perimeter for detection in the observation area is set by using the control knob or jumper, wherein the control knob or jumper adjusts the variable resistor (POT1) respectively. The detection perimeter may then be shown to the user 116 via a display on the device 110 which allows the user 116 to check if the detection perimeter is at the correct distance. At the output of the electronic circuit 200, a comparison is made between an output of the electronic circuit 200 and the threshold voltage set by the variable resistor, wherein the comparison is made by a comparator. The electronic circuit 200 outputs LOW logic if the input signal to the comparison stage is higher than threshold, output HIGH logic if the input signal is lower than threshold. In some examples, the variable resistor is a potentiometer or a dual-potentiometer.

The device 110 may comprise any number of the above identified components and any additional components not mentioned above which may help the functioning of the device 110.

Figure 4:
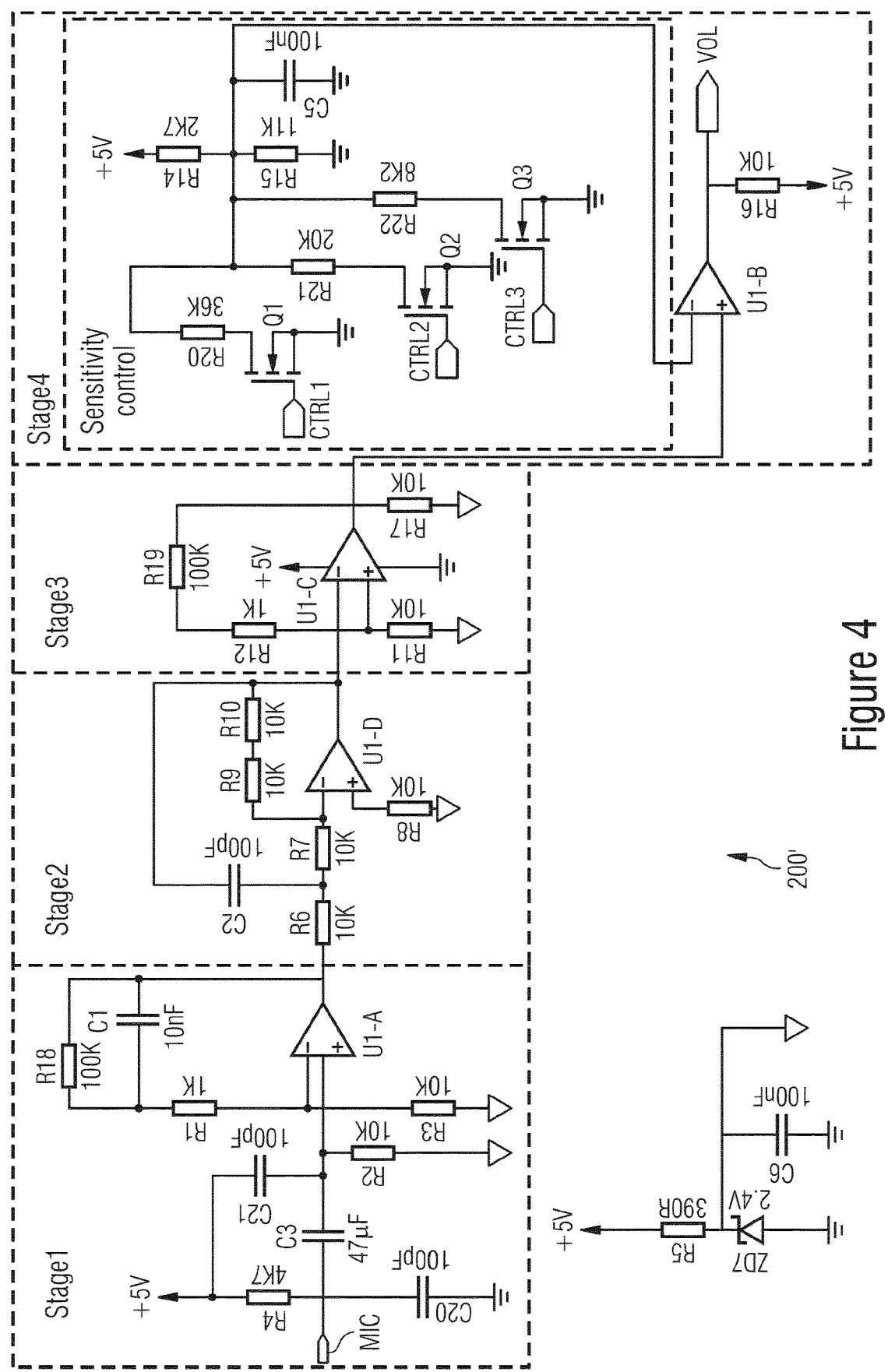
FIG. 4 shows an electronic circuit within the device according to some examples as described herein.

FIG. 4 shows an electronic circuit within the device according to some examples as described herein.

FIG. 4 shows an electronic circuit 200' with 4 main stages. In this case, the detection perimeter is set by using the software logic (a mobile app for example). In this example, there are no variable resistors and the gain throughout the circuit 200' is fixed. The threshold of the comparison stage is set by voltage divider set by 5 resistors (R14, R15, R20, R21 and R22) and is set by logic of signal CTRL1, CTRL2 and CTRL3, which act as a switch and as a result, carry four logic combinations. By switching CTRL1, CTRL2 and CTRL3 on or off, the threshold resistance, and therefore the threshold voltage, is altered.

The main differences between the electronic circuit 200 as laid out in FIG. 3 and this electronic circuit 200' is that the variable resistor POT1 is replaced by two 100 k resistors, R18 and R19. This leads to the gain of Stage 1 and Stage 3, as will be described below, being fixed instead of variable. The threshold voltage of comparator is set by a voltage divider R14 and R15. The threshold voltage can be altered by setting the logic of signal CTRL1, CTRL2 and CTRL3 which act as switches.

The four stages of the electronic circuit 200' are outlined below:

Stages 1 to 3: the detection is made of a method of treatment of low frequency sound initially on a circuitry level as defined below.

The circuit of sensor consists of the microphone 120, 202 as described above and signal treatment phases which comprise of low pass filters and aid the elimination of false positives:

Received frequencies pass through 3 stages. Stage 1 determines activation in Stage 2 and so forth, as a result of Stage 3, the remaining low-pass low frequencies that pass through the cut-off threshold of the low-pass filter are amplified again in Stage 3, are converted to a digital signal in Stage 4. Only low-pass frequencies pass through these layers, which may in turn eliminate false positives.

The stages work in a manner similar to the principle of neurons or similar to neural networks i.e. frequency spectrum passes through the stages with defined activation functions to the next stage. The low-frequency spectrum passes through the Stage 1 Low-Pass Filter (LPF) and amplifies it with a parameter variable gain between 1.1× and 11.1× (0.83 dB and 20.9 dB). The gain may be determined by the setting of the variable resistor in the case of FIG. 3. The amplified activated low-frequency spectrum then goes to Stage 2, second stage of LPF and amplifies the received signal again with a gain of −1 (0 dB). The activated amplified frequencies then go to Stage 3 and are amplified again before being converted to a digital signal in Stage 4.

Stage 4: digital signal treatment and trigger.

At Stage 4, the received analogue signals are converted to a voltage by a frequency-to-voltage converter and are then limited by a "cut-off" parameter set by the user 116 i.e. the threshold voltage set by the user 116. A mathematical coefficients model is then used to correlate the aperture of the frequency received and associated with voltage. Table 1 shows an example of the logic of CTRL1, 2 and 3 and the mathematical coefficients model. It can be seen that by switching CTRL1, 2 and 3 on or off, different resistances are applied to the comparison stage and so, the threshold voltage is altered.

TABLE 1

Combination of CTRL1 CTRL2 CTRL3 and output threshold voltage

| Case | CTRL1 Logic | CTRL2 Logic | CTRL3 Logic | Threshold Calculation | Threshold Voltage | Remark |
|------|-------------|-------------|-------------|----------------------|-------------------|--------|
| 1 | LOW | LOW | LOW | $5\ V \times \frac{R15}{R14 + R15}$ | 4.015 V | Lowest Sensitivity |
| 2 | HIGH | LOW | LOW | $5\ V \times \frac{R15//R20}{R14 + (R15//R20)}$ | 3.786 V | |
| 3 | LOW | HIGH | LOW | $5\ V \times \frac{R15//R21}{R14 + (R15//R21)}$ | 3.622 V | |
| 4 | HIGH | HIGH | LOW | $5\ V \times \frac{R15//R20//R21}{R14 + (R15//R20//R21)}$ | 3.435 V | |
| 5 | LOW | LOW | HIGH | $5\ V \times \frac{R15//R22}{R14 + (R15//R22)}$ | 3.175 V | |

TABLE 1-continued

Combination of CTRL1 CTRL2 CTRL3 and output threshold voltage

| Case | CTRL1 Logic | CTRL2 Logic | CTRL3 Logic | Threshold Calculation | Threshold Voltage | Remark |
|---|---|---|---|---|---|---|
| 6 | HIGH | LOW | HIGH | $5\text{ V} \times \dfrac{R15//R20//R22}{R14 + (R15//R20//R22)}$ | 3.031 V | |
| 7 | LOW | HIGH | HIGH | $5\text{ V} \times \dfrac{R15//R21//R22}{R14 + (R15//R21//R22)}$ | 2.924 V | |
| 8 | HIGH | HIGH | HIGH | $5\text{ V} \times \dfrac{R15//R20//R21//R22}{R14 + (R15//R20//R21//R22)}$ | 2.801 V | Highest Sensitivity |

In the case that saturation is reached, a digital output is generated and converted to binary numbers and is then further regulated by pre-programmed trained electronic logic (machine learning), where the compound activated numbers are weighted and is a function to be within a range of 0 and 1 using activation functions with bias of 2, which corresponds to the shock generated on doors or windows. The processing program has preferably been trained to recognize the coefficient of the amplification. The activation function may be a Sigmoid function or any other suitable type of function.

Following the above principle, different biases can be used for detecting other elements prior to their occurrence, such as first signs of leakages of water pipes in the buildings or if a person has fallen over.

Once the positive signal is detected, the program activates the alarm unit 140 and notifies the user 116 via a smartphone or monitoring and surveillance station or the like.

Figure 5:
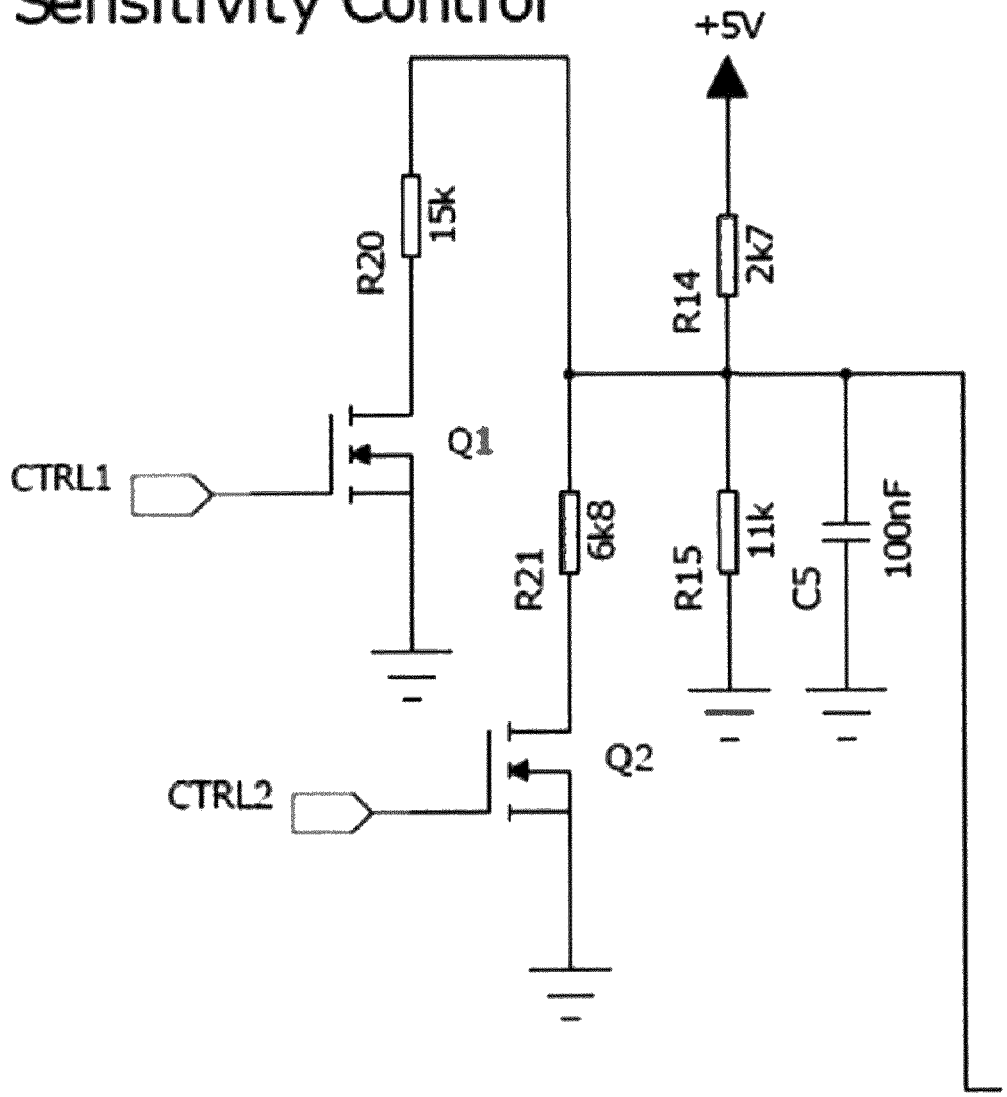
FIGS. 5 and 6 show sensitivity controls in the electronic circuit according to some examples as described herein.
Figure 6:
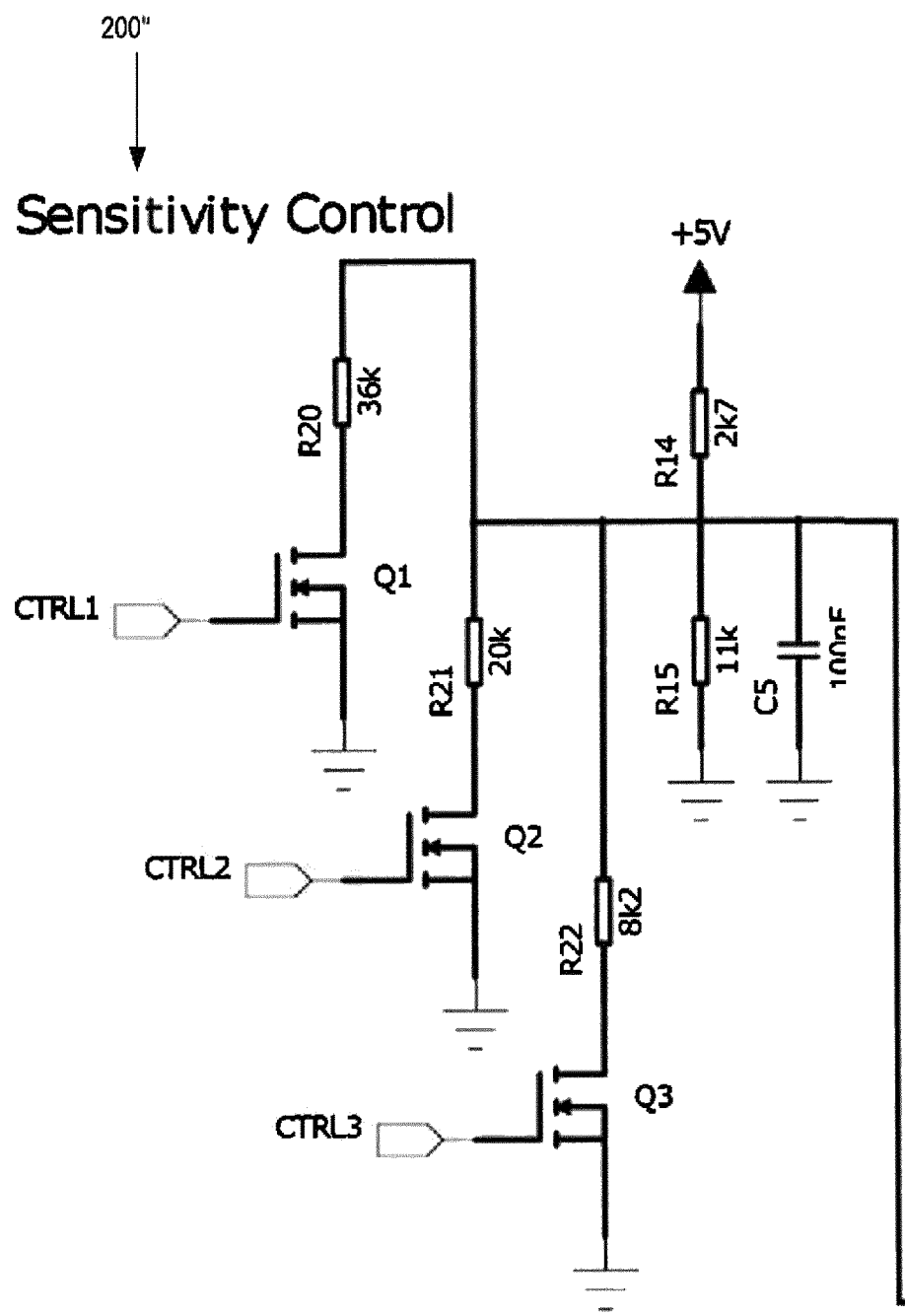

FIGS. 5 and 6 show sensitivity controls in the electronic circuit according to some examples as described herein.

The sensitivity control of Stage 4 is shown in more detail in FIGS. 5 and 6. In the sensitivity control circuit of FIGS. 5, Q1 and Q2 perform as switches. The logic of CTRL1 and CTRL2 can control Q1 and Q2 to open or short circuit to Ground. Then R15 will be standalone or parallel with R20 and/or R21. As there are two switches, there is a total of four potential resistor layouts, each causing a different level or resistance to be applied to the circuit 200' and therefore, each causing a different threshold voltage to be achieved. The highest threshold voltage is achieved when both Q1 and Q2 are switched off and the lowest threshold voltage is achieved when both Q1 and Q2 are switched on.

FIG. 6 shows a similar layout but with three switches Q1, Q2 and Q3, as is shown in FIG. 4. This leads to a possibility of different number of threshold voltages.

Figure 7A:
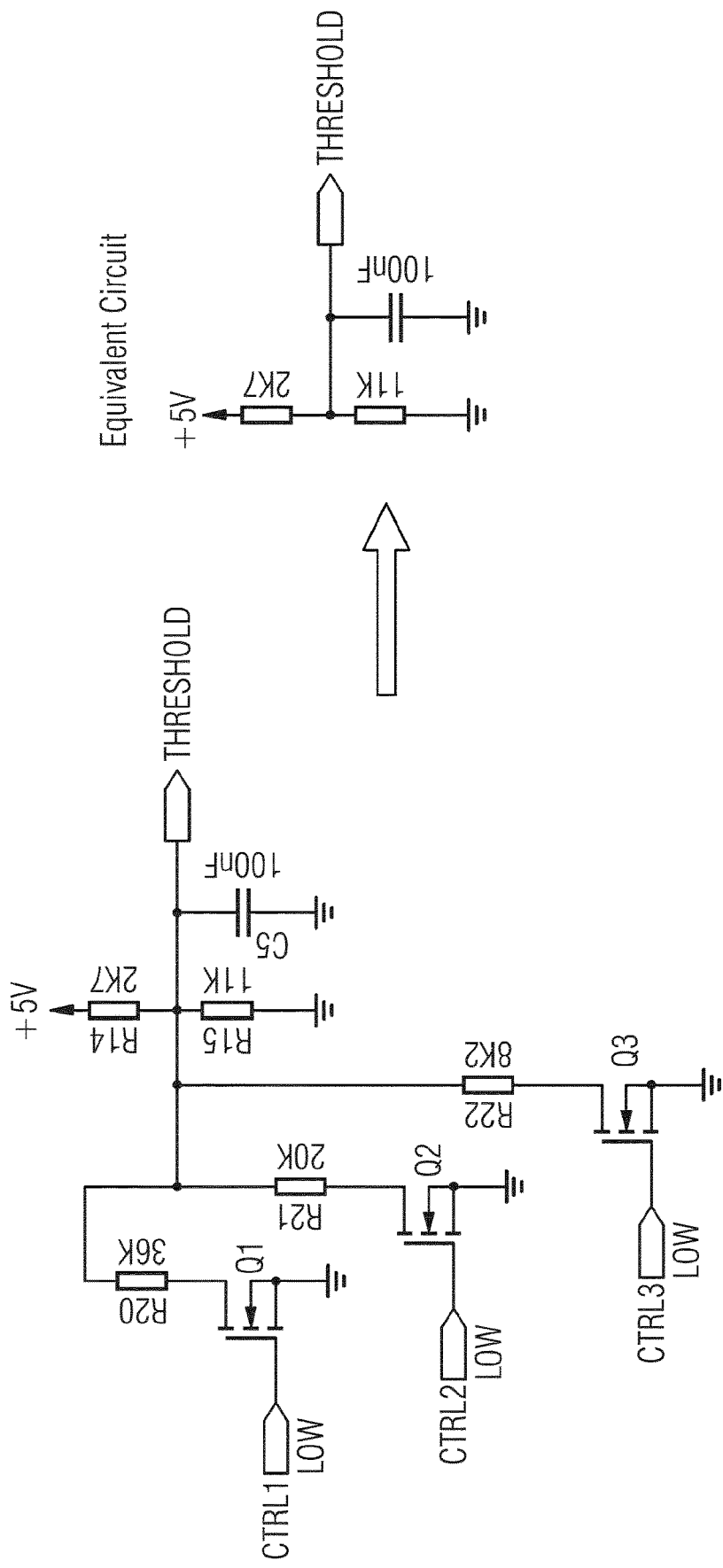
FIGS. 7a and b show sensitivity control units according to some examples as described herein.

FIGS. 7a and b show sensitivity control units according to some examples as described herein.

As described above, Q1, Q2 and Q3 can act as switches. FIG. 7a shows a scenario when all switches are in the LOW setting i.e. are switched off. It can be seen that none of the resistors coupled to the switches are taken into account. Therefore, the only resistors attributing to the resistance of the circuit are those within the voltage divider.

Figure 7B:
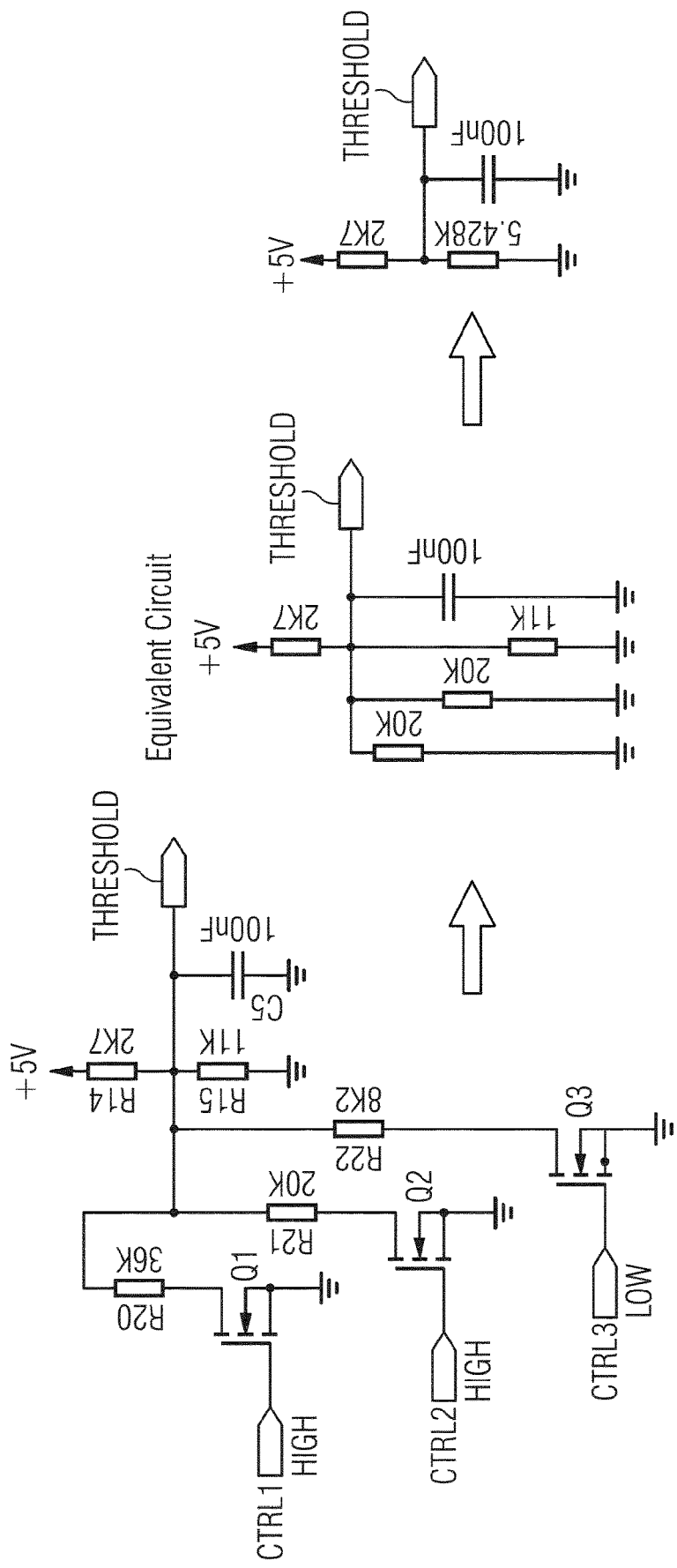

FIG. 7b shows a scenario when Q1 and Q2 are in the HIGH setting i.e. switched on and Q3 is in the LOW setting. It can be seen that the resistors coupled to Q1 and Q2 are in parallel with one of the resistors of the voltage divider. This in turn reduces the threshold voltage and makes the sensitivity control unit of FIG. 7b more sensitive than that of FIG. 7a.

Q1, Q2 and Q3 can all be switched on or off depending on the wished threshold voltage thereby increasing or decreasing the sensitivity of the sensitivity control unit. There can be any number of CTRL logic inputs and any number of switches which may allow for the device to be fine tuned.

Figure 8A:
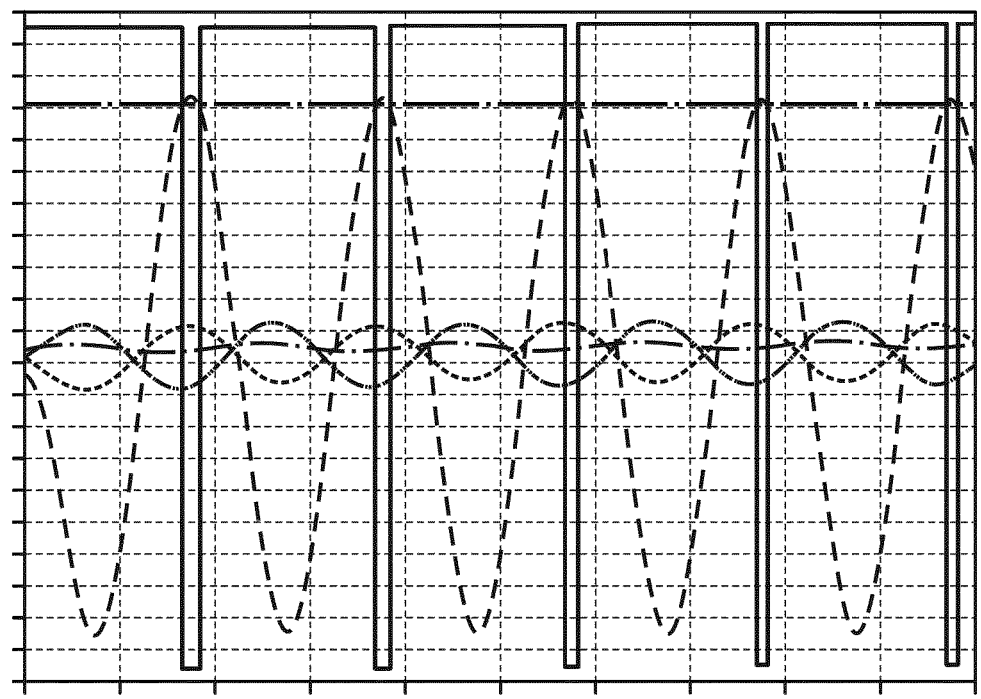
FIGS. 8a and b show output graphs of the electronic circuit units according to some examples as described herein.

FIGS. 8a and b show output graphs of the electronic circuit units according to some examples as described herein.

Figure 8B:
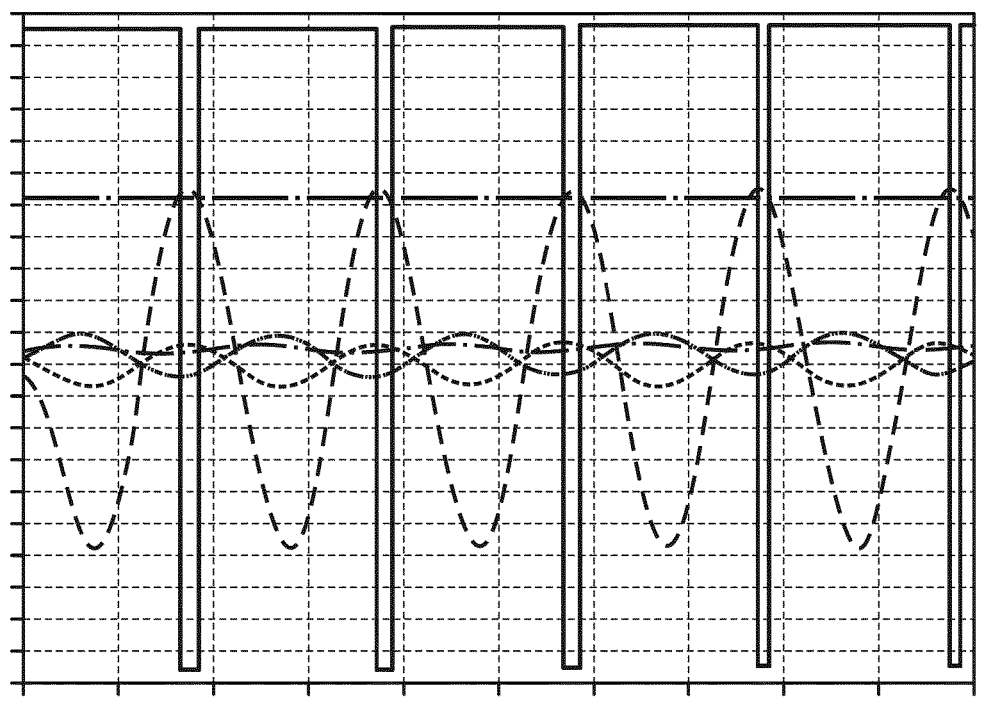

FIG. 8a shows an output graph of the voltage in the scenario of FIG. 7a and FIG. 8b shows an output graph of the voltage in the scenario of FIG. 7b.

It can be seen that the stage 3 output is used in the comparison stage, wherein the output voltage is compared with the threshold voltage set by the switches. When the output voltage of the frequency-to-voltage converter exceeds the threshold voltage, the output of Stage 4 changes from HIGH to LOW. When the output voltage of the frequency-to-voltage converter falls below the threshold voltage, the output of Stage 4 changes from LOW to HIGH. The change to, in this example, LOW indicates to the alarm unit 140 and/or the machine learning unit 130 that the threshold voltage has been exceeded and that an alarm may be primed and/or triggered dependent on the output of the machine learning unit 130. In some examples, when the output voltage of the frequency-to-voltage converter exceeds the threshold voltage, the output of Stage 4 changes from LOW to HIGH. When the output voltage of the frequency-to-voltage converter falls below the threshold voltage, the output of Stage 4 changes from HIGH to LOW. In some examples, the alarm unit 140 is triggered when the output voltage of the frequency-to-voltage converter exceeds the threshold voltage regardless of the output of the machine learning unit 130.

Even though the above figures are described in relation to FIG. 4, the skilled person understands that the same concept applies to the example of FIG. 3.

FIG. 9 shows a coupling between the device and a router according to some examples as described herein.

The same device 110 as depicted in FIG. 1 connects in this example to the Internet using fixed or mobile connectivity. An integrated algorithm within the device 110, and preferably within the connection testing unit 160, in addition to screening sound vibrations, also constantly analyses Internet network strength, availability and security. In case of lack of connectivity or security breach, the device 110 switches to another available network, to ensure constant connection, as depicted in the basic block diagram in FIG. 7. The user 116 can overwrite this algorithm by manually setting the preference through the mobile application.

Each device 110 and each connectivity module of the device 100 carries a unique identifier, generated at the moment of the first setup process and has an encryption certification installed to allow security alerts to be transmitted by the encrypted channel. These may be installed via the encryption unit 150 and/or the connection testing unit 160. The device constantly screens connectivity attempts, as depicted in the basic flowchart in FIG. 10, as will be described in more detail below.

FIG. 9 illustrates a schematic diagram of the network stability analysis and data encryption, applied in conjunction with break-in security system device and prior to connecting such device to the Internet, in order to ensure secure data connectivity channel. To ensure the connectivity of the device 110 with the Internet in a consistent and secure manner in an encrypted form, a connectivity test is done with a router 108 through a wireless and/or a wired link 300. When the private security device 110 is installed in the premises, an encrypted and secure connection is tested and established with the router 108 before connecting the device 110 to the Internet or the cloud through the Internet.

During the connectivity set up and testing, encryption certificates are installed in the device 110 or alternatively, the encryption certificates may be pre-installed in the device 110. This ensures secure offline and online connectivity of the private security device 110. On a local network, in the case of an attempt of connection by non-recognized device, it will not be recognized. This is done by the device 110 only being visible to paired devices after setup has been completed, wherein the paired device carries the same key and/or a compatible key for pairing to the device 110. The key is automatically generated by the device 110 at the moment of setup and may not be transmitted. Such a key is used in communication and pairing with other devices locally by using pairing over Bluetooth, for example. The encryption methods that the device 110 uses may comprise a set of several certifications managed and updated by different providers. When transporting information over the Internet, the information carries a set of certificates and encryption keys. Various algorithms may be used with hash functions up to 512. The key identifier, generated at each stage of the process, allows for the monitoring of the entire security chain from the local connectivity to the connectivity to the server.

Figure 10:
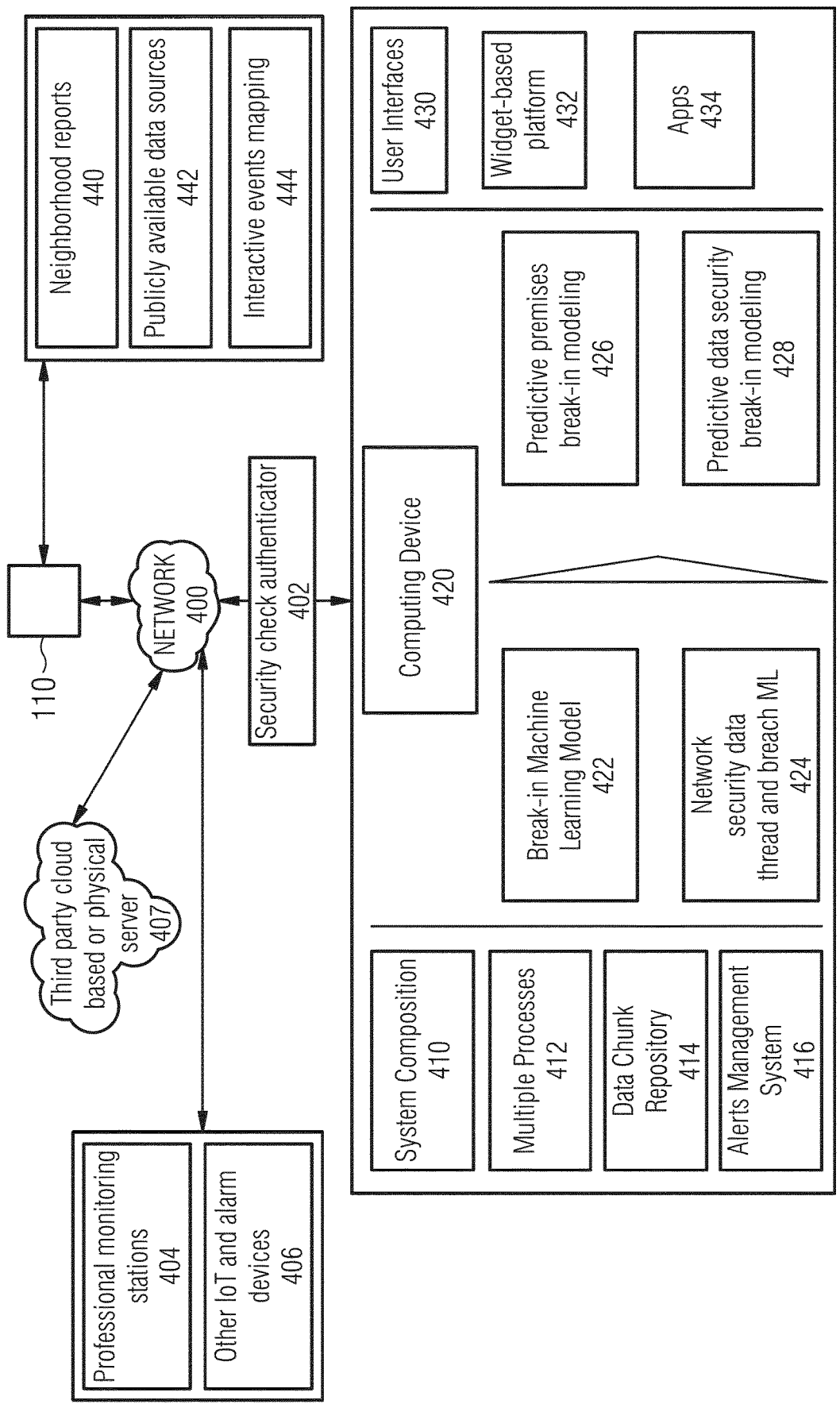
FIG. 10 shows a schematic diagram of the device and methods of machine learning and alarm activation according to some examples as described herein.

FIG. 10 shows a schematic diagram of the device and methods of machine learning and alarm activation as well as connectivity to other cloud-based/physical server according to some examples as described herein.

In an example of the present disclosure, described with reference to FIG. 8, a basic schematic diagram of the system composition 410 is illustrated. The system composition 410 comprises multiple processes 412 that store data received in repository in a form of data chunks 414 and a separate location of the system which is allocated for the alerts management that receives and treats security alerts from the device 110. Security alerts received from the device 110 are verified as depicted in the basic flowchart in FIG. 11, which will be described in more detail below. The computing device 420, located in the cloud or dedicated server across the networks may perform the initial training of the supervised ML model within the machine learning unit 130 related to premises break-ins 422 and to the network security data threads and breach 424.

The alert management system 416 may automatically and immediately notify the potential break-in to the user 116 and/or a monitoring surveillance company, and may trigger sending moving or stationary devices equipped with sensors 182 for security surveillance through the automated platform or as per user request. It may also feed the break-in prediction modelling 422, 426 with data points, following user agreement and verification.

The predictive premises break-in modeling 426, may be based on the following data points: verified security alerts received from the device 110, visual confirmations from surveillance cameras 180 and moving or stationary devices equipped with sensors 182, publicly available data sources 442, such as break-in reports, newswires, having its geographical location, as well as neighborhood watch reports 440 available through the web interface and interactive events mapping 444. Results of the break-in modeling 422, 426 are shared through the platform.

The predictive data security break-in modeling 422, 426, as depicted in FIG. 8 may additionally or alternatively be based on the following data points: frequency of anomalies detected on the data blocks received from a single device location, detected through performance of an unsupervised learning neural network accelerator logic and detected attacks to improve the security channel.

Specially designed customizable widget-based platforms 432, apps 434, and web-interfaces 430 for neighborhood reports 440, as depicted in FIG. 8, serve as the communication with the users 116 and allow users 116 to control the device 110, grant or remove access to manage the security platform in the form of user management, use additional services from other platforms connected over, for example, API, as well being able to store any form of data related to the break-in, aggression and/or network security modelling, in a secured data repository. In some examples, the user 116 is able to configure the device 110 to gives certain rights such as, for example, receiving notifications, switching the device on or off or giving camera 180, 182 access to only certain people during certain time periods. This may allow for a more secure device.

FIG. 10 illustrates a schematic diagram depicting the security system main elements, computing devices and methods to analyze break-in data points as well as data security transmission alerts and predictive modeling generated therefrom. As shown in FIG. 8, the device 110 is connected to a system composition 410, cloud-based computing device 420 and a smartphone application 434 through a public network such as Internet 400 or alternatively through a private connection such as a Virtual Private Network (VPN). The system of the present invention includes multiple processes 412 to process the data that is stored in the form of data chunks in Data Chunk Repository 414, an Alerts Management System 416 in a separate location of the system allocated for the alerts management, wherein the alerts management system 416 receives and treats security alerts from the device 110. The computing device 420 may be located in a cloud or as a dedicated server across the network 400 and the computing device 420 may perform the initial training of the supervised ML model relating to break-in data 422 and relating to network security data threads and breach 424.

In some examples, the device 100 is coupled to a (e.g. third party) physical server and/or a cloud server 407, wherein the physical server and/or the cloud server 407 is configured to receive results from the device 110. In some examples, the coupling is via a wired and/or wireless router and/or mobile network. In some examples, if the device 110 detects an interruption in the network 400, the device switches to a different network. As a non-limiting example, if the device 110 detects an interruption in the wired coupling to the router, the device may then switch to a wireless coupling to the router or to the mobile network so as to ensure that there is a coupling to the physical server and/or the cloud server 400. In some examples, the device 110 comprises a battery (not shown) in case of a power outage. In some examples, the device 110 notifies a user 116 if there is a power outage. This may allow for a secure storage of device results in a separate location. In some examples, the device 110 is connected to Internet using mobile network.

In some examples, before signals are received by the computing device 420, the signals go through a security check authentication 402. The security check authenticator 402 may check an identifier of the device 110 with a whitelisted identifier. If the identifiers match, the signals are then received by the computing device 420. If the identifiers do not match, the received signals are rejected. If a received signal is rejected, the network 400 and/or the device 100 and/or the computing device 420 may trigger an alarm and/or send a notification to a user 116 than an unauthorized device has tried to couple with the computing device 420.

In some examples, a professional monitoring station 404 and/or other IoT (Internet of Things) and alarm devices 406 are coupled to the network 400. These may go through the same security check authentication 402 as signals from the device 110.

The predictive premises break-in modeling 426, as depicted in FIG. 8, is used for prediction of the break-in time instances and locations. The prediction is based on machine learning modelling and may be based on the data points such as verified security alerts received from the device 110 through the network 400, visual confirmations from surveillance cameras 180 and moving or stationary device equipped with sensors 182 installed in or near the premise 444, publicly available data sources 442 such as break-in reports, newswires, having its geographical location, as well as neighborhood watch reports 440 available through the web interface 430.

The predictive data security break-in modeling 428, as depicted in FIG. 8, may be based on the data points such as frequency of anomalies detected on the data blocks received from a single device location detected through performance of an unsupervised learning neural network accelerator logic and detected attacks to improve the security channel.

The system of the present invention uses a customizable widget-based platform 432, apps such as mobile application 434, and web-interface 430 for neighborhood reports 440. The platform 432 and the application 434 serve as the communication with the users and allow users to control the device 110 wirelessly and remotely, grant or remove rights to the security platform, as described above, use additional services from other platforms connected over, for example, API, as well being able to store any form of data, related to the break-in, aggression and/or network security modelling, in a secured data repository.

Figure 11:
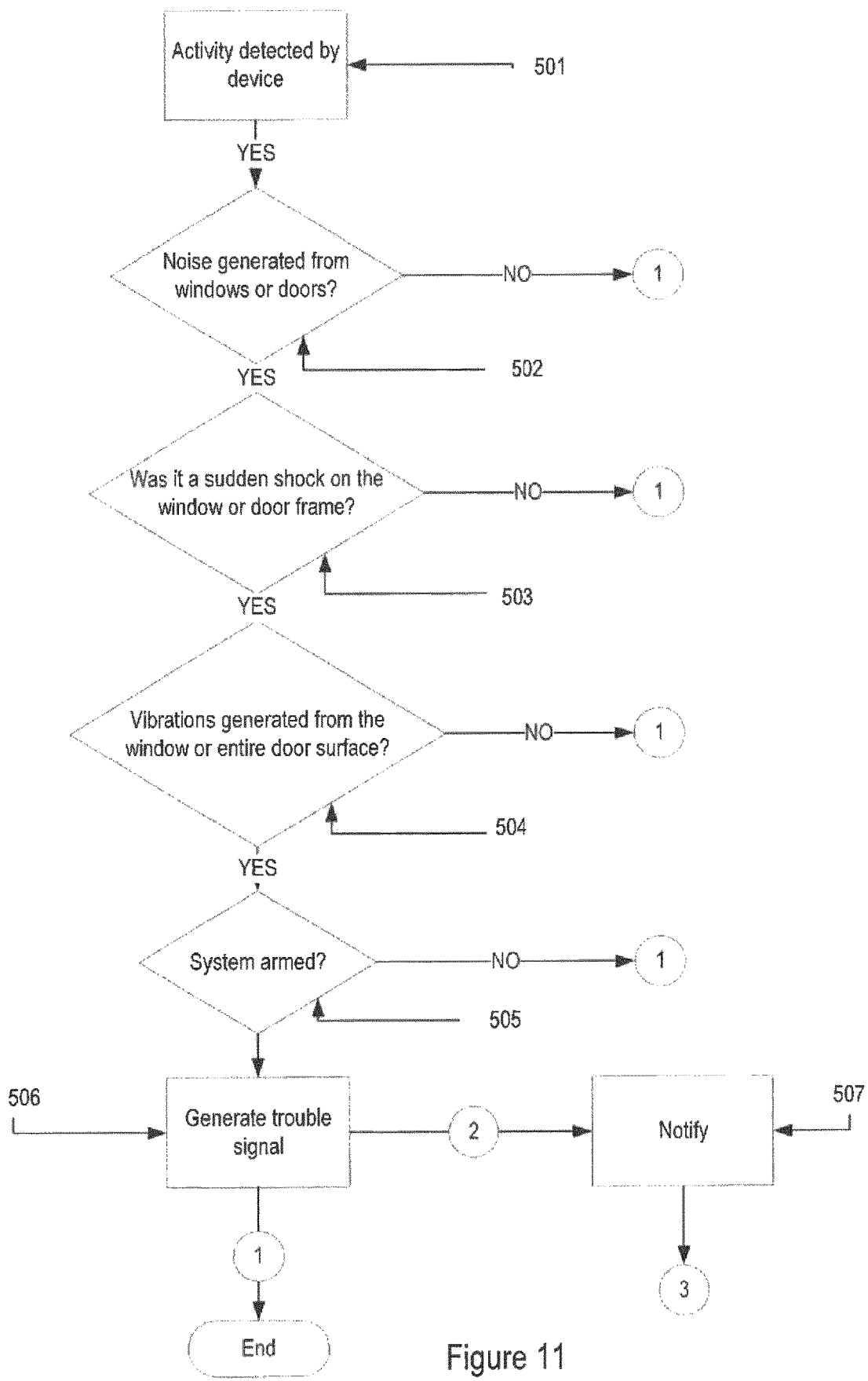
FIG. 11 shows a flow diagram of a break-in detection method and alarm verification according to some examples as described herein.

FIG. 11 shows a flow diagram of a break-in detection method and alarm verification according to some examples as described herein.

FIG. 11 illustrates a flowchart showing the steps of the positive break-in detection trigger and alarm verification according to the present disclosure. As described above, the positive break-in detection within the processor 132 of the device 110 is configured to reduce the rate of false positives of the break-in detection. The process of the positive break-in detection trigger and alarm verification starts with the activity being detected by the device 110, 501 via, for example, the microphone 120, 202, it is then determined by the device 110, preferably by the machine learning unit 130, if the noise is generated from windows or doors 502. If the noise is generated from windows or doors, it is then determined, preferably by the machine learning unit 130, if the noise was from a sudden shock on the windows or door frame 503. If it is determined that the noise was from a sudden shock on the windows or door surface, it is then determined if the vibrations are generated from window or entire door surface 504. If it is positively determined that the vibrations are generated from window or entire door surface, then it is determined if the system is armed 505. Accordingly, upon a positive determination, a trouble signal is generated by the system 506 and a notification is generated 507. The notification is sent to the user 116 for the approval i.e. whether the user 116 has generated the detected noise or not. The predefined period that determines a sudden shock may be a predefined number of milliseconds, such as, for example, 100 ms or 500 ms. In some examples, the predefined period is 30 ms. In some examples, the predefined period is 300 ms. In some examples, the predetermined period is 3000 ms. The predefined period may be determined by the user 116 and/or predetermined.

Figure 12:
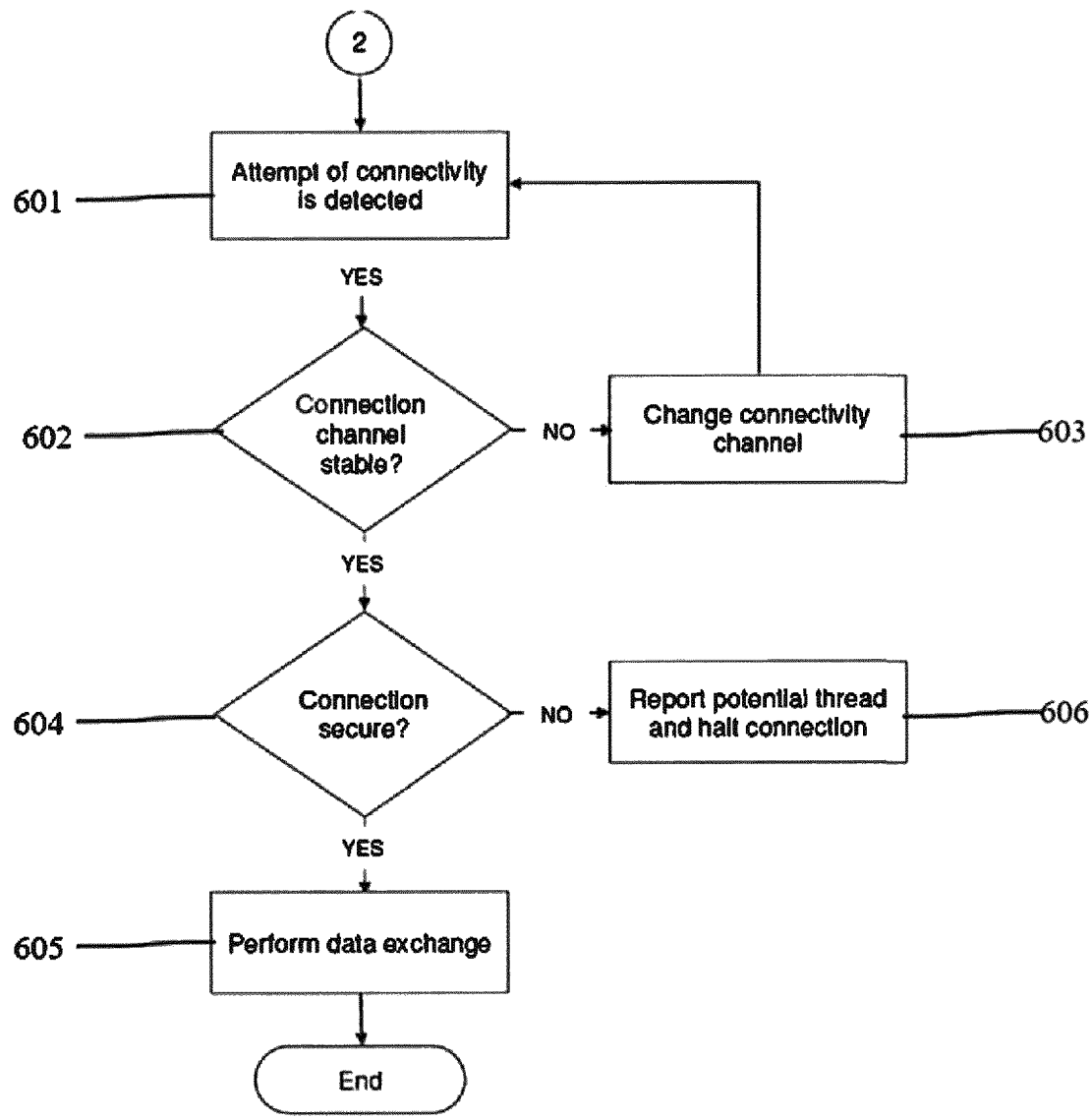
FIG. 12 shows a flow diagram of a connectivity attempt screening method according to some examples as described herein.

FIG. 12 shows a flow diagram of a connectivity attempt screening method according to some examples as described herein.

FIG. 12 illustrates a basic flowchart showing the steps performed by the system to constantly screen connectivity attempts. When the system generates a trouble signal, an attempt of connectivity of the private security device 110 to the router 108 installed in the premises 100 is detected 601 and if the connection 300 is detected, then the stability of the connection 300 is detected 602. Upon detection of an unstable connection, the connectivity channel is changed 603 and a further attempt of connectivity of the device 110 is detected. If it is determined that the connectivity is stable, then, it is determined if the connection 300 is secure 604. If the connection 300 is found to not be secure, then the connection 300 is halted and a security threat and breach is reported to the system and to the user 116, 606. If the connection 300 is found to be secure, then, the data exchange containing the information of the device 110 and the break-in is performed 605. In this way, the data is always exchanged in a secure manner and the continuity of the connection 300 is maintained by the device 110.

Figure 13:
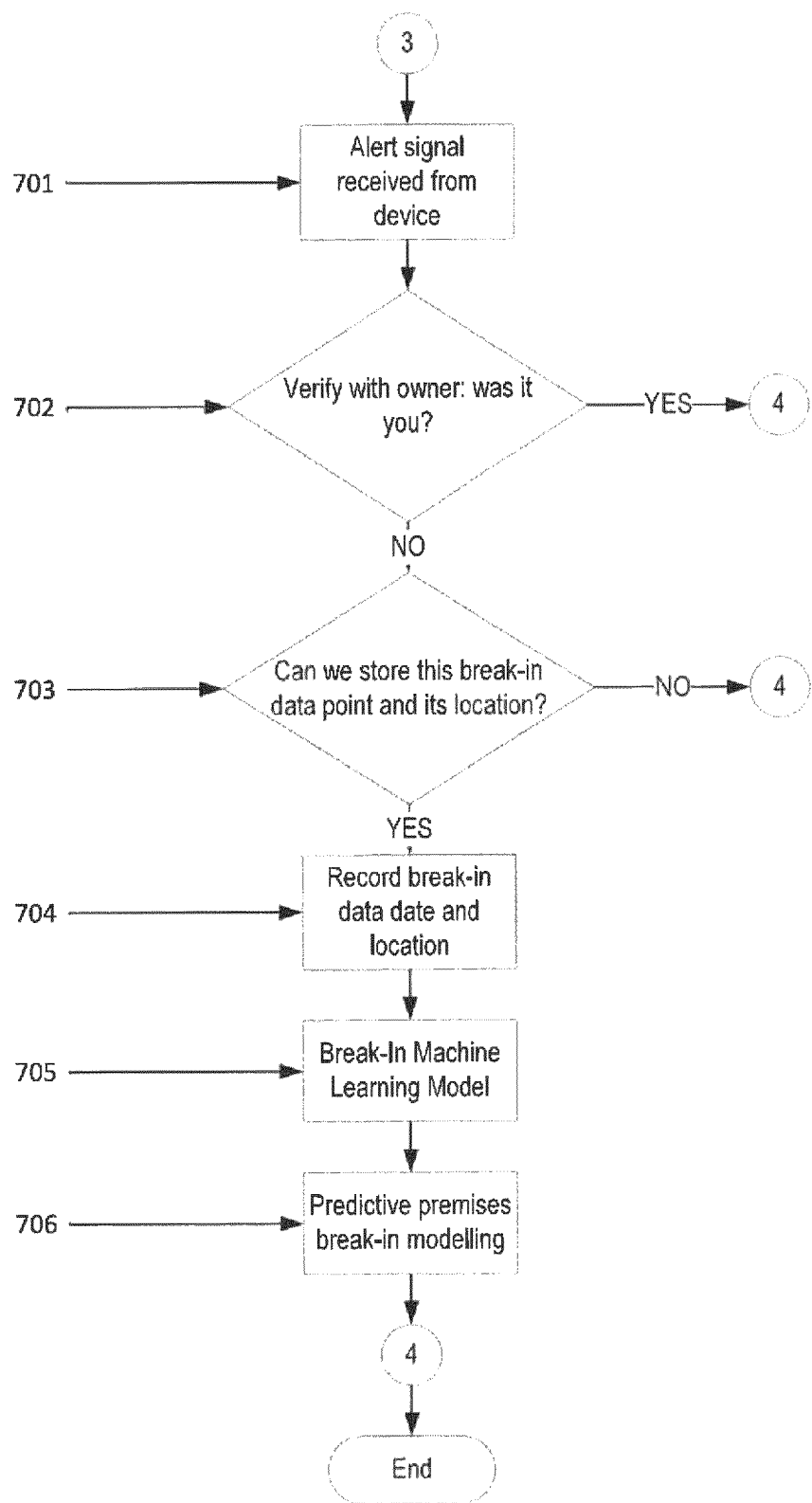
FIG. 13 shows a flow diagram of a security alert verification method according to some examples as described herein.

FIG. 13 shows a flow diagram of a security alert verification method according to some examples as described herein.

FIG. 13 illustrates a basic flowchart showing the steps performed by the system to verify the security alerts received from the device 110. When a user 116 is notified of a positive break-in and a trouble signal, the signal is received by the user 116 as a push notification, an SMS or an e-mail from the device 110, 701. It is then determined if the activity detected by the device 110 is of the user 116 via verification from the user 116, 702. If it is determined that the activity detected by the private security device 110 is of the user 116, then no more checks are done to verify the correctness of the alert signal. If the activity was not of the user 116, then it is determined if the data such as location, time and other information of the detection can be stored in the system 703. If the data can be stored, then the break-in data and location are recorded 704, a machine learning model is applied 705 and the results are input to the predictive premises break-in modelling 706 to contribute to the machine learning algorithm.

The input data points to the machine learning algorithm consist of 3 main sources:

(1) information received from the device 110, provided that the user accepted sharing of such information, (2) information from publicly available domains such as newswires, press about breaking and location, and (3) user interface platform, that (a) allows users to share the data about potential break-ins and (b) feeds back in predictive model for training purposes.

Such data points are collected on the basis of location and trigger type. The trigger can be break-in siren, a panic alert, fire or a power outage. Each data point with a given timestamp is weighted taking into consideration parameters such as source and occurrence. Machine learning model training may be done via imputing training data and test data containing true and false data points. Model prediction improvement and cross-validation of bias may be made by obtaining feedback from users via the user interface platform. In some examples, the machine learning algorithm uses a random forest classifier and/or a recurrent neural network and/or a convolutional neural network to train the machine learning unit. Recurrent is used for data with time stamp (events) convolutional is used for imaging.

Figure 14:
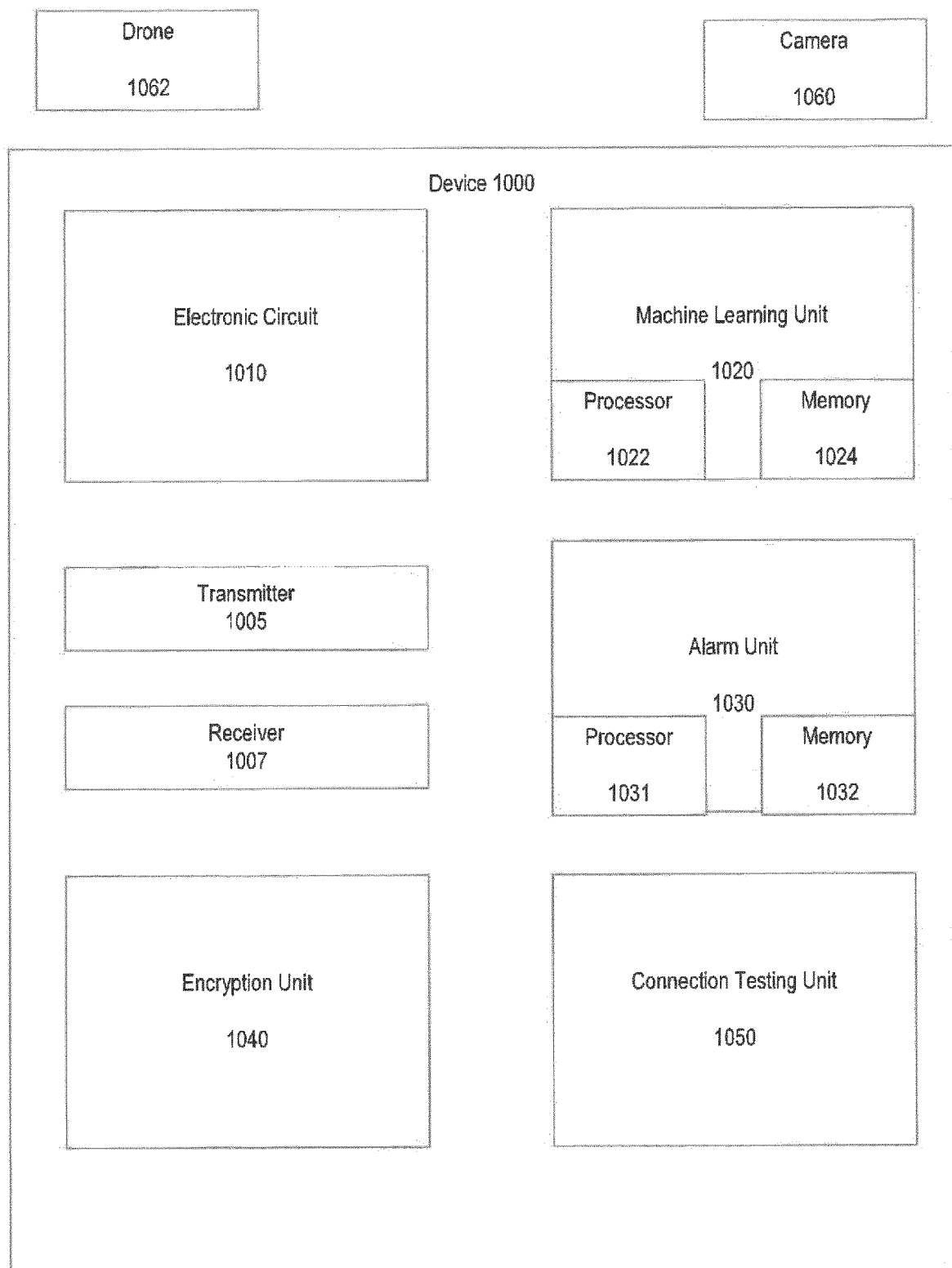
FIG. 14 shows a schematic diagram of a device for break-in prevention according to some examples as described herein.

FIG. 14 shows a schematic diagram of a device in particular for break-in prevention according to some examples as described herein.

A wireless sensing device 1000 can be placed on the inside or outside of premises 100 and can be placed on the structure such as wall, door or window frame. The device 1000 detects a single person or a group of people. The device 1000 may detect human presence up to a distance of 50 meters in an open field i.e. when placed on the outside of premises 100. When placed on a surface inside of premises 100, with a wireless detection element facing the surface, the detection range may be limited to distance of meters. In such a case, and to ensure maximum performance of the sensor, the device 100 may be placed on wooden structures, such as doors, or brick or concrete walls. The device 100 may allow for an area covering up to 180° angle to be monitored. The distances mentioned above are only examples and the distances may be larger or smaller depending on the environment the device 1000 is in.

The surface on which the device 1000 is placed has different variables such as, for example, thickness and type of material which may result in a reduction of signal strength, reflection and propagation. The problem of the signal penetration over various surfaces may be addressed through the circuitry design and antenna design as well as signal measuring algorithms related thereto, wherein the algorithms may include outlier exclusion, anomaly detection and treatment in a given timeframe.

Human detection may be achieved by measurements taken from the received radio signal determining size of object, direction and speed of movement, which comprise elements for consideration of supervised machine learning (ML) algorithm to identify that the object is a person. Secondary machine learning methods may be applied to identify human intentions by the way of walking and their movement behavior. Tertiary machine learning methods may applied to determine whether the person is moving or stationary, moving parts of the body such as hands and/or legs, metal objects which may be carried by the person, heart beat frequency as well as, in combination with the heat sensor, the body temperature of the person.

The device 1000 comprises a transmitter 1005 and receiver 1007, a machine learning unit 1020 comprising a processor 1022 and a memory 1024, an alarm unit 1030, an encryption unit 1040, a connection testing unit 1050, and an electronic circuit 1010.

The machine learning unit 1020, the alarm unit 1030 (comprising a processor 1031 and a memory 1032), the encryption unit 1040 and the connection testing unit 1050 may all be substantially similar (or identical) to the components mentioned in relation to FIG. 2 above. In some examples, the transmitter 1005 and receiver 1007 and/or the alarm unit 1040 may communicate with a camera 1060 and/or a moving or stationary device equipped with sensors 1062 in a similar manner (or identically) as described in relation to FIG. 2.

The transmitter 1005 and receiver 1007 preferably use ultra wide band (UWB) technology. UWB technology uses very broadband signals (at least 500 MHz, up to several GHz bandwidth), with center frequencies between 3.5 GHz and 8 GHz. This may allow for the electromagnetic waves which are transmitted and received at these frequencies to penetrate wooden doors and brick walls with minimal interference. This may result in the received signal-to-noise ratio (SNR) being high enough to enable the radar to get information about the environment behind the wall. In some examples, the transmitter 1005 and receiver 1007 use the UWB communication standard IEEE 802.15.4-2011. The transmitter 1005 and/or receiver 1007 may additionally or alternatively use any other radio frequency band.

The transmitter 1005 and/or the receiver 1007 antennas are configured to be optimized, and designed, to be placed very near to a wall (or a door or a window frame) and—in case of two antennas (one Tx antenna and one Rx antenna)—very near to each other. The transmitter 1005 and the receiver 1007 antennas are on a single circuit board. In some examples, the transmitter 1005 and receiver 1007 are combined in a transceiver. The antennas are described in more detail below.

The electronic circuit 1010 and/or the machine learning unit 1020 may be configured to measure a channel impulse response (CIR) between the transmitter channel (Tx) and the receiver channel (Rx) of the transmitter 1005 and receiver 1007 respectively. An UWB CIR is defined as the answer (i.e. the channel output at the Rx) of the communication channel, given an UWB pulse as channel input (i.e. sent by Tx). The CIR characterizes the channel from Tx to Rx, and is usually given as a function of time (often a "power-delay profile" is used, giving similar details of the channel). The time is between transmission and receipt is the "time of flight" and, hence, can be directly converted into a distance by, for example, the processor 1022 and/or memory 1024 of the machine learning unit 1020.

The UWB CIR allows insights and conclusions about the environment. For instance, in the case that there is a direct (unobstructed) path (line-of-sight—LOS) between Tx and Rx with a distance x0, for the signal it takes t0=x0/c to travel from Tx to Rx, wherein c is the velocity of the electromagnetic wave, in vacuum the speed of light). Hence, the UWB CIR shows a corresponding amplitude at time to. Particularly, reflections of the transmit signal are visible in a CIR. As an example, a reflection leading to a path between Tx and Rx of length x1 (x1>x0)—corresponds to a delay of t1. Hence, based on an UWB CIR reflectors/scatterers, i.e. structures that reflect/scatter the UWB signal back can be identified, and the corresponding time of flight (or path length) can be determined. Due to the large bandwidth of the UWB signal used, the timely (and therefore also the spatial) resolution of the CIR is very high. This may lead to a more accurate identification of an object by the machine learning unit 1020.

An UWB CIR is described in the equivalent (or complex) baseband. The "taps" (isolated and small amplitudes in the CIR, typically from LOS or a single strong reflector) or the clusters (of several reflectors or scatterers leading to a spread of the corresponding amplitude(s)) in the CIR, are complex values, signified by magnitude and phase (or a real and an imaginary part).

The device 1000 may be able to get information about the environment behind the wall, door or window to which it is mounted by measuring UWB CIRs. This is possible by monitoring the UWB CIR over time and interpreting the variations. Two UWB CIRs may be measured, the Reference CIR and the Test CIR. A potential target may be detected in the Test CIR. An example for a typical target in the context of a security system is an intruder (=>Alarm) or a passer-by (=>no Alarm).

The Reference CIR is a (potentially) pre-processed UWB CIR of the surveillance area without a target. Furthermore, quantities as, e.g., distance and size of the target are estimated, which leads to the classification of targets. As a non-limiting example, an intruder who enters the surveillance area and approaches the radar while a passer-by may also approach the radar but walk away again. The size of the target may also be important to the classification of the target, e.g., to differentiate between an approaching human being and a dog or cat. Depending on the received SNR and the target, it is possible to distinguish different parts of the target and their movements, e.g., the moving arms or legs of a person by the receiver 1007 and/or the electronic circuit 1010 and/or the machine learning unit 1020. This again may then be used for the target classification.

A certain number of single Reference CIRs are measured and collected. They are aligned in time (i.e., they are aligned such that they have the same time basis/axis, hence static reflectors will be found in all aligned CIRs at the same time of flight—or same distance to the radar, respectively). Preferably, the time aligned Reference CIRs are averaged (to increase the SNR), leading to the new (the averaged) Reference CIR.

The Test CIR can be preprocessed in a similar way, or non-averaged, single Test CIRs are used. Afterwards, the Test CIR and the Reference CIR are aligned in time. Additionally, the number of collected Reference CIRs is used to estimate mean and standard deviation for the amplitudes of the Reference CIR. Based on this statistic, for a given confidence (e.g. 5 times the standard deviation, i.e. 5 sigma) upper and lower bounds of the amplitudes can be determined. This leads to a confidence interval, which is larger for distances where the fluctuations of the Reference CIR are stronger (e.g. some trees moving in the wind) and smaller where the CIR fluctuates less. In some examples, the confidence interval may be based on a measurement of one or more reference CIRs.

A target detection can be declared in the cases of:
  the Test CIR differs strongly from the Reference CIR, regarding magnitude or phase or both;
  a Test CIR is outside the confidence intervals for a certain distance or certain distances. This may be based upon an "adaptive" threshold which is changed are more Reference CIRs are collected and stored;
  the cross correlation (taken section by section) of Reference CIR and Test CIR is below a certain threshold.

Each of these approaches can be combined to improve the detection probability. Different from a standard radar, where usually detection is only due to the reflection of the target, according to the present disclosure, the detection can also be due to the fact that the target is blocking (or attenuating) a reflection found in the Reference CIR. Hence, also targets that do not reflect the UWB signal can be detected.

In case of a new tap in the Test CIR in comparison to the Reference CIR, the target reflection may be detected and the position of the target tap in the Test CIR may give an estimate of the target distance. In the case that one or more taps of the Reference CIR are no longer contained in the Test CIR, the target is blocking one or more reflectors/scatterers of the Reference CIR. Hence, the distance to the nearest blocked tap is an upper bound of the target distance. In case the cross correlation drops strongly for a given section of Reference CIR and Test CIR, the distance of this section is an estimate of the target distance.

Additionally, the target can be tracked by evaluating the distance estimates over time as well as the estimation of the target's velocity. Target tracking allows for target classification (comparing, for example, "person approaching" and "passerby"). Static targets, approaching targets, non-approaching targets, leaving targets, fast targets, slow targets, etc. can be distinguished from each other via this tracking. Tracking the phase changes of the different parts of the Test CIRs may also contribute to target classification.

In some examples, the Radar Cross Section (RCS) is estimated. The RCS determines the power reflected by a target (the higher the RCS, the stronger the reflection). Based on the estimated target distance an estimate of the target's RCS is calculated by the electronic circuit 1010 and/or the machine learning unit 1020. The RCS differs for different target materials and, hence, can be used for target classification.

The machine learning unit 1020 uses machine learning for detection of targets, classification of targets, calibration of the system, and alarm declaration. ML algorithms are based on different features, as the measured CIRs directly as well as on the signal processing results, e.g., target detection, distance estimation and tracking, RCS estimation, and, if possible, detection of different parts of the target and their movements, e.g., the moving arms or legs of a person, etc. The machine learning unit 1020 may achieve this by monitoring Doppler and/or Micro-Doppler velocity measurements based on the received UWB signals.

The machine learning unit 1020 develops over time and receives better insights into the Reference CIR as more Reference CIRs are stored. This enables better target classification and to predict target behavior. ML algorithms are used to calibrate the system for a given environment (e.g., by determining the number of CIRs used to calculate the averaged Reference CIR, calculating the adaptive threshold—given by the "confidence intervals" etc.). Furthermore, the machine learning unit 1020 learns in a suitable training phase when to give an alarm and when not. This training phase may be undertaken in a laboratory, a secured environment, or at the user's premises 100.

In some examples, the transmitter 1005 and receiver 1007 are together as a single transceiver. In some examples, there are multiple transmitters 1005 and receivers 1007 or transceivers. In this case, all received signals may be transmitted to a single electronic circuit 1010. In some examples, there are multiple electronic circuits 1010 coupled to the multiple transmitters 1005 and receivers 1007 or transceivers and the outputs from the electronic circuits 1010 are transmitted to a single machine learning unit 1020.

In some examples, the transmitter 1005 and receiver 1007 are configured to transmit and receive pseudo-random noise, PRN, codes. This may allow for the resolution of the radar, i.e. the determination and identification of objects, and the Signal-to-Jam-Ratio (S/J) to be improved. This may in turn allow for the receiver 1007 and/or the machine learning unit 1020 to receive clearer inputs, thereby improving the accuracy of the detection of objects within the monitoring field of the device 1000. The use of a PRN code may result in a spreading sequence that may, in turn, result in a UWB signal.

In some examples, the electronic circuit 1020 is configured to evaluate an autocorrelation function based on the received PRN codes. This may allow for the receiver 1007 and/or the machine learning unit 1020 to receive clearer inputs, thereby improving the accuracy of the detection of objects within the monitoring field of the device.

Figure 15:
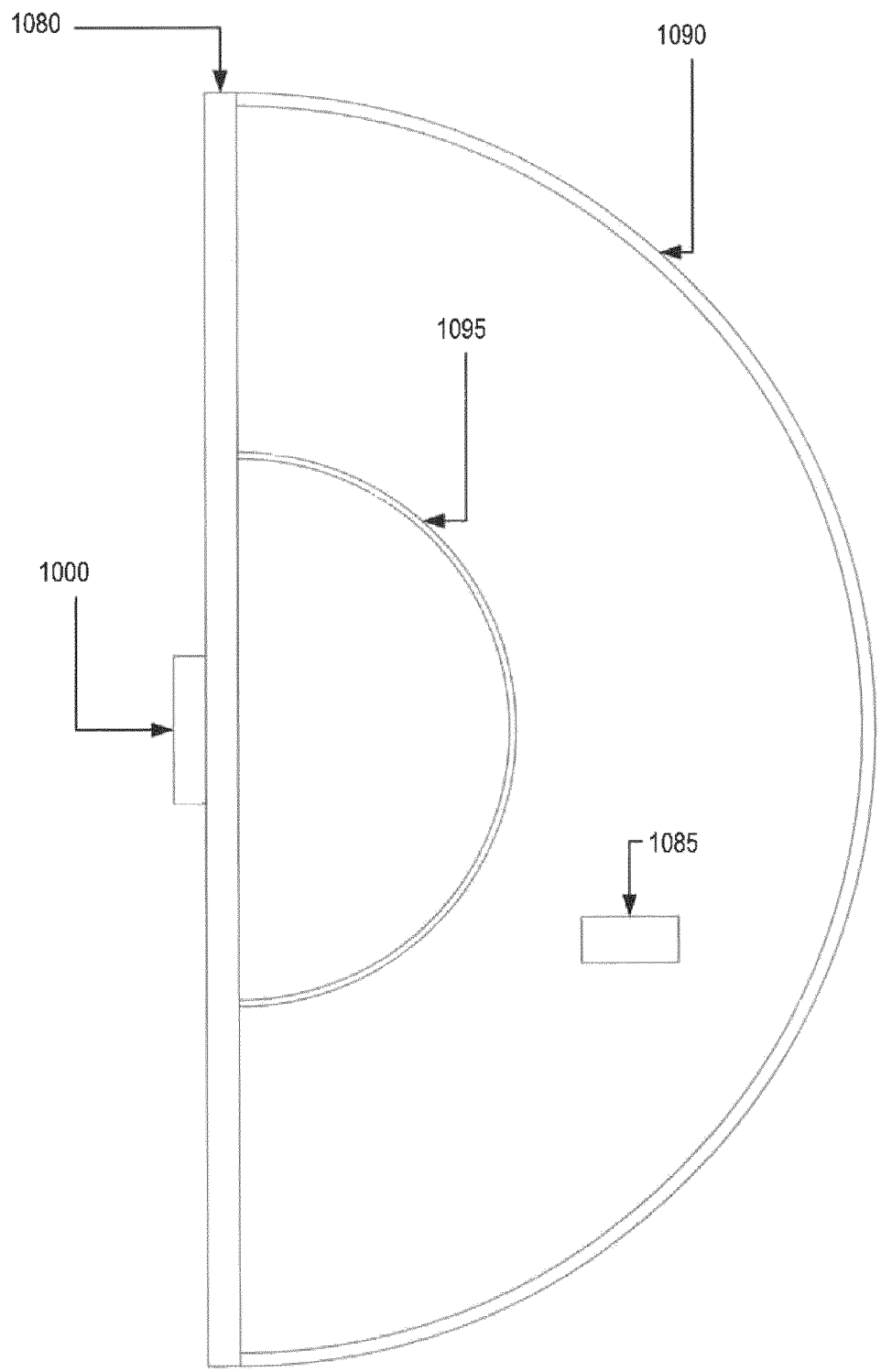
FIG. 15 shows a schematic diagram of a method of object detection according to some examples as described herein.

FIG. 15 shows a schematic diagram of a method of object detection according to some examples as described herein.

A 1-dimensional radar system is able to detect targets and to determine the distance from the radar to the target. Typically, it is based on one Tx and one Rx antenna. 2-dimensional systems additionally allow estimating the angle under which targets are detected. Typically, they are based on (one or) several Tx and several Rx antennas, and apply standard (antenna) array processing, e.g. angle-of-arrival estimation. Additional information about the height of detected targets are estimated by 3-dimensional systems, also based on antenna arrays at Tx and Rx. The present disclosure can be adapted to be a 1D, 2D or 3D system depending on the use of the device 1000. In the device 1000, which shows a 1D system, both antennas, Tx and Rx i.e. the transmitter 1005 and the receiver 1007, are facing the wall (or the door, or window etc.).

The CIR in this setup is able to characterize the environment behind the wall. However, the performance of such a UWB radar depends strongly on the attenuation of the received signal by the wall. In case of stone walls, wooden walls/doors, or glass walls/doors/windows the antennas have an influence on the performance of the radar. Hence, one can optimize the antennas for the material through which the UWB signals are being transmitted and/or received.

In FIG. 13, the device 1000 is placed inside a building on, for example, a wall 1080. The skilled person understands that this may not be a wall but a door, a window frame or any other part of a building. The device 1000 identifies and determines an object 1085 via the methods described above. The device then determines if the object 1085 is within the outer perimeter 1090 or the inner perimeter 1095 and then tracks the object 1085 according to the methods described above. The outer perimeter 1090 may be, for example, 10 meters from the device 1000 and the inner perimeter 1095, for example, 3 meters from the device 1000. Each perimeter may be a 180° arc from the device 1000. The perimeter distances and the arc lengths and degrees of field of view may be altered depending on the environment of the device 1000 and the area which is wished to be monitored.

In some examples, the machine learning unit 1020 is configured to determine a position and/or a size and/or a direction of movement and/or a velocity of the object 1085 based on the received UWB signals and the methods described in this disclosure.

Figure 16:
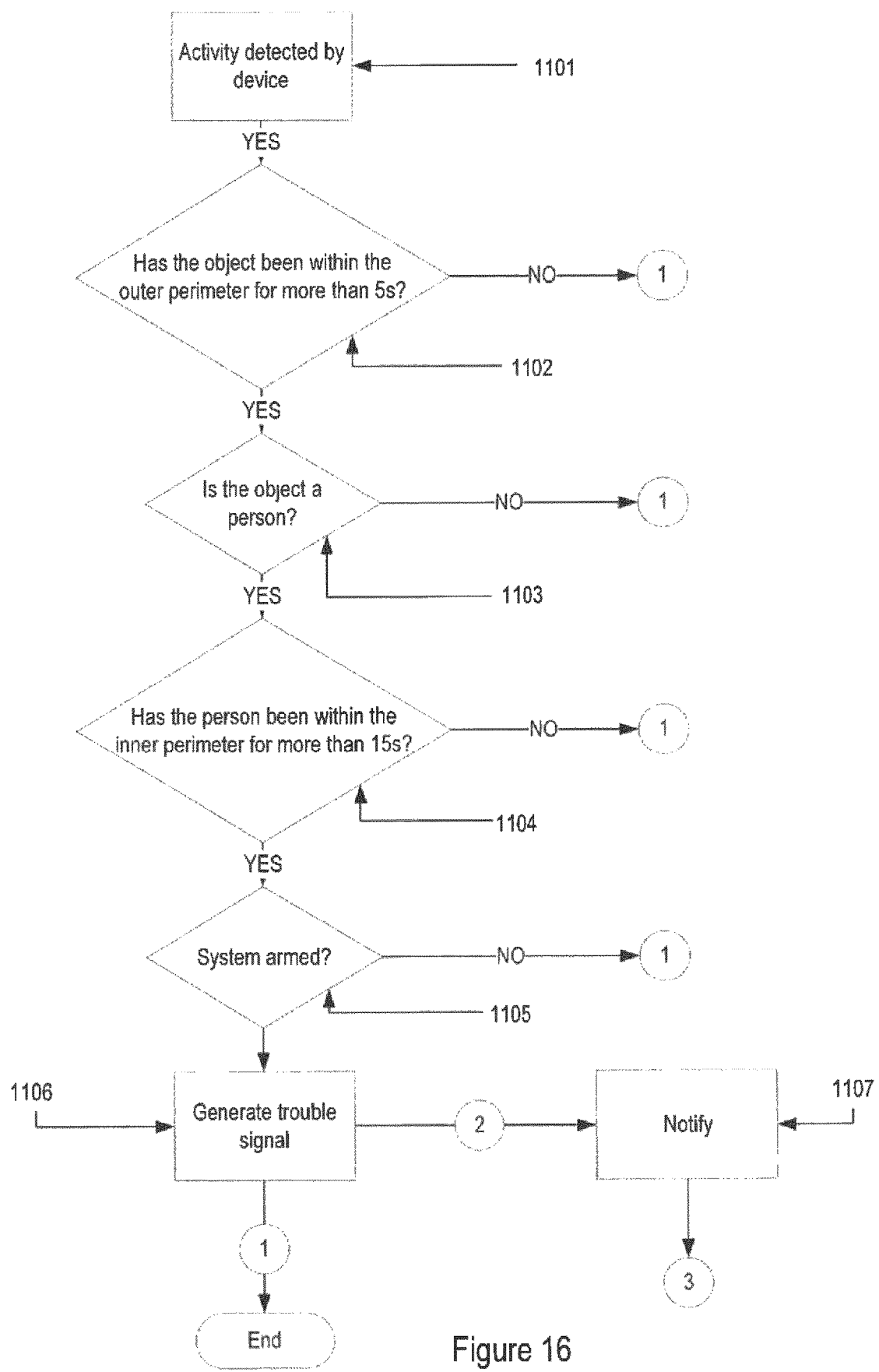
FIG. 16 shows a flow diagram of a break-in detection method and alarm verification according to some examples as described herein.

FIG. 16 shows a flow diagram of a break-in detection method and alarm verification according to some examples as described herein.

The device 1000 detects an activity within the outer perimeter 1090, 1101. The device then determines if the object has been within the outer perimeter 1090 for more than 5 seconds, 1102. If this is the case, the device 1000 then determines if the object 1085 is a person 1103. Upon a positive result, the device 1000 then tracks the person and determines if the person has been within the inner perimeter for more than 15 seconds 1104. Then it is determined by the device 1000 if the system is armed 1105. Accordingly, upon a positive determination, a trouble signal is generated by the system 1106 and a notification is generated 1107. The notification is sent to the user 116 for the approval i.e. whether the user 116 is the detected person or not.

Figure 17A:
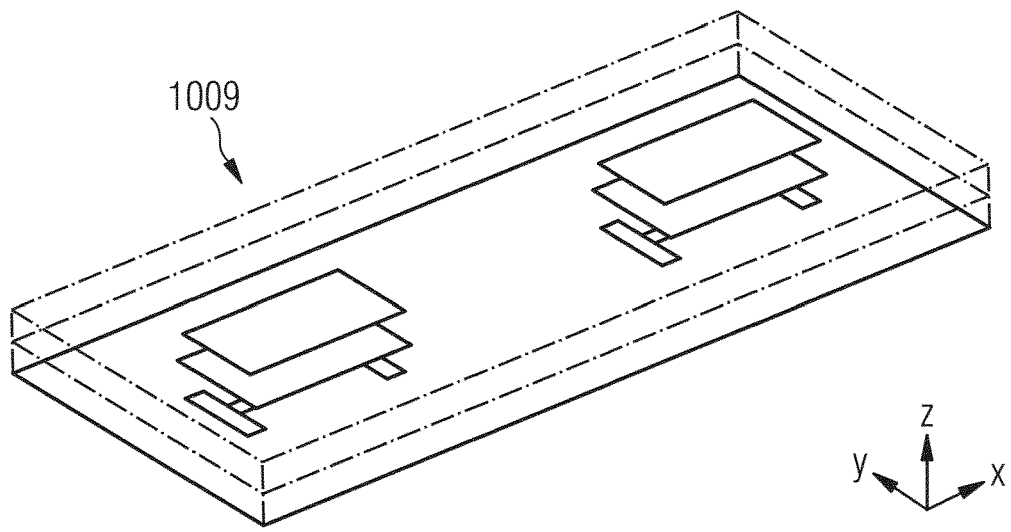
FIG. 17a to c show perspective views of an antenna according to some examples as described herein.
Figure 17B:
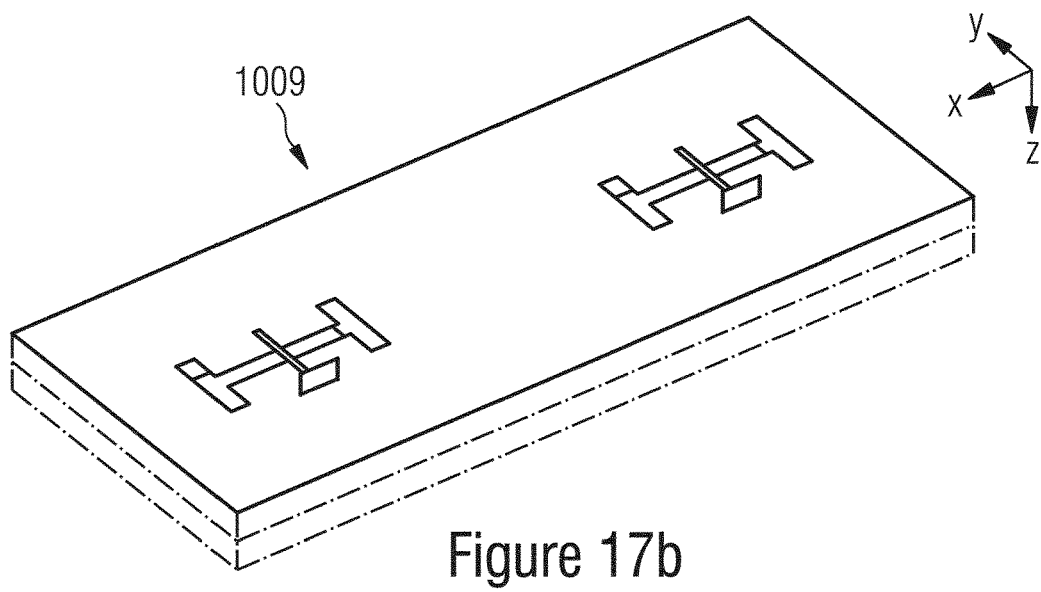
Figure 17C:
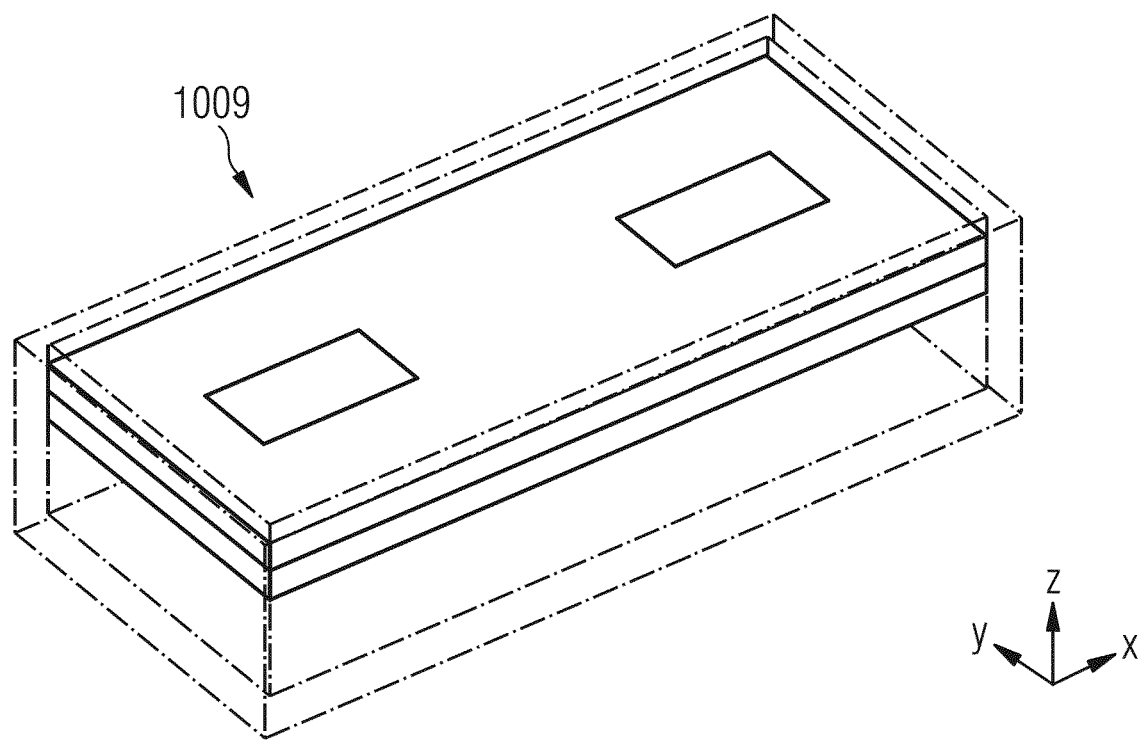

FIGS. 17*a* to *c* show perspective views of schematic illustrations of an antenna according to some examples as described herein.

The antenna 1009 is preferably a stacked antenna comprising the transmitter 1005 and the receiver 1007 (shown in FIGS. 17*a* and *b*). The antenna 1009 is preferably a printed circuit board, PCB, stack up antenna. The antenna 1009 comprises in this example multiple layers. The first layer may be a bottom layer comprising e.g. copper followed by a layer comprising e.g. RO4350B, followed by a second layer comprising e.g. copper, followed by a layer comprising e.g. RO4450F, followed by a second layer comprising e.g. RO4350B, followed by a second layer comprising e.g. RO4450F, followed by a third layer comprising e.g. copper, followed by a third layer comprising e.g. RO4350B and finally, a fourth layer comprising e.g. copper. Each of these layers may be of any suitable depth for a patch antenna 1009. The layers may additionally or alternatively comprise other materials similar (laminates or metals) to those described above while maintaining the properties of the materials described above.

As can be seen in FIG. 17*c*, in some examples, the antenna 1009 may comprise an enclosure. The enclosure may comprise acrylonitrile-butadiene-styrene, ABS, copolymers and/or any other suitable material. In some examples, the thickness of the enclosure is preferably 2 mm. In some examples, there is an absorbing material on the inside walls of the enclosure configured to absorb UWB signals and/or electromagnetic interference and/or any external environmental factors that may reduce the effectivity of the antenna 1009.

The antennas 1009 may be characterized by being optimized such that:
(i) the influence of the wall (or door or window) in the near field does not significantly reduce the efficiency of the antennas 1009,
(ii) the reflection of the wall is reduced in both the transmission and receiving phases,
(iii) they support the large UWB bandwidth, and
(iv) the antenna pattern supports the radar setup, i.e. high antenna gain towards the wall, and reduced directivity away from the wall.

In some examples, transmitter 1005 and/or receiver 1007 antenna is a patch antenna which may be linearly polarized. The antenna may have a composition enabling the required bandwidth and impedance-matching optimized for obstacles such as, for example, walls, doors or windows in the near field. The pattern may be characterized by a strong gain towards the obstacle in the near field and side lobe rejection. This may lead to a device 1000 which is directivity optimized.

Figure 17D:
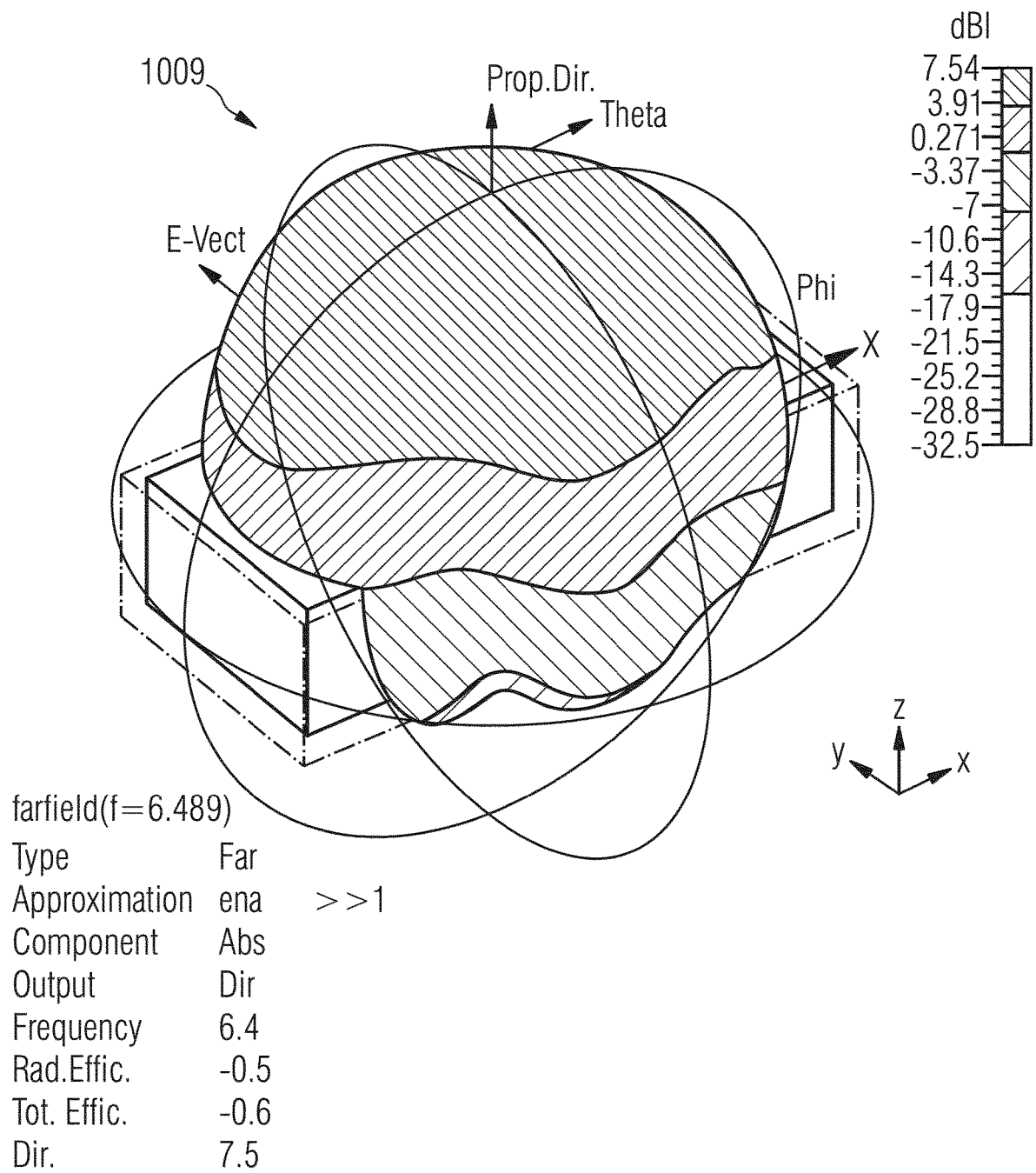
FIG. 17d shows radiation of an antenna according to some examples as described herein.

FIG. 17*d* shows a radiation pattern of an antenna according to some examples as described herein.

FIG. 17*d* shows a directivity radiation simulation of the antenna 1009 described above. It can be seen that the radiation of the antenna 1009 is primarily directed away from the antenna 1009 and towards, for example, a wall and/or a door and/or a window frame to which the antenna 1009 is directed. This may allow for near field interference to be rejected by the antenna 1009, and alone for objects behind the wall and/or door and/or the window frame to be detected and/or identified by the device 1000 while not identifying and/or detecting objects on the site of the wall the antenna 1009 is facing. This may allow for a particularly efficient antenna 1009 and therefore, a particular efficient device 1000.

Figure 18:
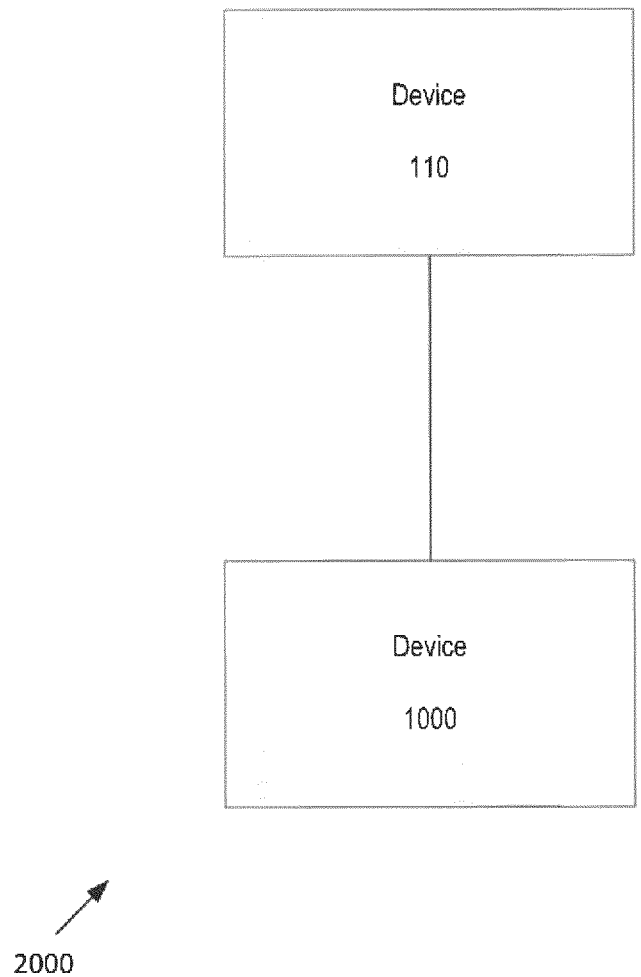
FIG. 18 shows a system according to some examples as described herein.

FIG. 18 shows a system according to some examples as described herein.

The system 2000 comprises both the first device 110 described in relation to FIGS. 1 to 11 and the second device 1000 described in relation to FIGS. 12 to 14. The system 2000 may be manually operated by a user 116 or may be automatically armed depending on a preference of the user 116. In some examples, the devices 110, 1000 are coupled to one another via an encrypted secure connection like the connection described in the present disclosure. Furthermore, the term "system" may refer to a security system which comprises the two devices 110, 1000 mentioned within this disclosure.

Throughout the present disclosure, when any resistors, Op-Amps, transistors, capacitors or any other electrical component have been shown and a value given, the skilled person understands that these are only examples and that other values for the electrical components are also possible.

Any advantages and uses described in relation to the device 110 described in relation to FIGS. 1 to 11 may also apply to the device 1000 described in relation to FIGS. 12 to 14 and vice versa.

The following examples are also encompassed by the present disclosure and may fully or partly be incorporated into the above-described examples and embodiments.

1. A break-in security system device installed at a home or a business establishment comprising:
   a processor;
   a memory coupled to the processor, the memory comprising executable instructions;
   a connection module to connect the device to internet through a wired or wireless medium;
   an encryption module for secure communication;
   the processor through execution of the executable instructions screens sound vibrations and constantly analyses internet network strength;
   the device has a unique identifier generated at the set-up of the device; and
   the device connects to a cloud to receive security alerts.
2. The break-in security system device of clause 1, further connects to a router to connect to the internet.
3. The break-in security system device of clause 1, further screens vibrations, detects break-in and generates alarm signal.
4. The break-in security system device of clause 1, further is programmed using a connected mobile application or software.
5. The break-in security system device of clause 1, switches to a different network when a security breach is detected by the break-in security system device.
6. The break-in security system device of clause 1, switches to a different network when a low connectivity strength is detected by the break-in security system device.
7. A security and alert management system comprising:
   a security device installed at a home or a business establishment;
   a computing device located remotely to perform supervised ML training of break-in data, network security data threads and breach;
   an alert system sending drones (or generally, any moving or stationary device equipped with one or more sensors) for security surveillance on a user request; and
   a smartphone application to control the security device.
8. The security and alert management system of clause 7, wherein the computing device is located at a cloud or at a remote location.
9. The security and alert management system of clause 7, wherein the smartphone application is used to program and control the configuration settings of the security device.
10. A method of controlling a security device installed at a home or business establishment by a cloud-based server system comprising the steps of:
    performing the initial training of the supervised machine learning model for data related to break-in in the premises in which the security device is installed;
    sending drones (or generally, any moving or stationary device equipped with one or more sensors) for security surveillance;
    feeds the premises break-in prediction modelling with data points;
    feeds the predictive data security break-in modeling; and
    perform training based on data received from the security device.
11. The method of clause 10, wherein the data points to feed the break-in prediction modelling comprises one or more of verified security alerts received from the security device, visual confirmations from surveillance cameras and drones (or generally, any moving or stationary device equipped with one or more sensors), publicly available data sources, and neighborhood watch reports available through the web interface.
12. The data points to feed predictive data security break-in modeling of clause 10, comprises one or more of frequency of anomalies detected through performance of an unsupervised learning neural network accelerator logic and detected attacks to improve the security channel.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "break-in security system device", "private security device", "device", and "security device", are interchangeable and refer to the break-in security system device 110, 1000 of the present invention.

Notwithstanding the forgoing, the break-in security system device 110, 1000 and system 2000 of the present invention can be of any suitable size and configuration as is known in the art without affecting the overall concept of the invention, provided that it accomplishes the above stated objectives. One of ordinary skill in the art will appreciate that the various components of the invention can be embodied as software, hardware or combination of both generally known as the firmware.

Various modifications and additions can be made to the exemplary examples discussed without departing from the scope of the present invention. While the examples described above refer to particular features, the scope of this invention also includes examples having different combinations of features and examples that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

No doubt many other effective alternatives will occur to the skilled person. It will be understood that the invention is not limited to the described examples and encompasses modifications apparent to those skilled in the art and lying within the scope of the claims appended hereto.

The invention claimed is:

1. A device comprising:
    a microphone configured to detect a noise from a surrounding area of the device, wherein the microphone has an operational frequency of up to 1600 Hertz,
    an electronic circuit coupled to the microphone, wherein the electronic circuit comprises (i) at least one low-pass filter configured to filter the detected noise and (ii) a frequency-to-voltage converter configured to convert a frequency of the filtered detected noise into a voltage;
    a machine learning unit comprising:
    a processor;
    a memory;
    a plurality of common false alarm rate clustering algorithms, allowing for a target to be detected in a non-stationary background;
    a plurality of normalized template matching methods, allowing for the accurate sorting and classification of voltage spikes to prevent false alarms; and
    a plurality of spiking cochlea models;
    wherein the processor is configured to analyze the detected noise using the machine learning algorithms stored in the memory; and
    an alarm unit configured to receive, from the machine learning unit, information on the analyzed detected noise and to receive, from the electronic circuit, the voltage.

2. The device as claimed in claim 1, wherein the alarm unit is configured to trigger an alarm if the analyzed detected noise and the voltage satisfy respective predetermined conditions.

3. The device as claimed in claim 2, wherein the electronic circuit further comprises a potentiometer, configured to alter the predetermined condition for the voltage.

4. The device as claimed in claim 2, wherein the electronic circuit further comprises a digital controller configured to alter the predetermined condition for the voltage.

5. The device as claimed in claim 1, further comprising an encryption unit configured to encrypt an output signal output by the device between the device and a network entity to which the device is connectable or coupleable within a network, wherein the output signal comprises a signal output by one or both of the alarm unit and the machine learning unit.

6. The device as claimed in claim 5, wherein the encryption unit is configured to allocate a unique identifier to the device and to install an encryption certificate to the device.

7. The device as claimed in claim 1, further comprising a connection testing unit configured to test a connection between the device and a network entity to which the device is connectable or coupleable within a network.

8. The device as claimed in claim 1, wherein the machine learning unit is configured to be trained via publicly available data sources and/or peer reports.

9. The device as claimed in claim 1, wherein the machine learning unit is configured to analyze the detected noise and determine if the detected noise is a shock on a door frame and/or a window frame, lasting less than a predefined period.

10. The device as claimed in claim 1, wherein the alarm unit is configured to output an audio alarm and/or a visual alarm and/or send a notification to a user of the device and/or a monitoring surveillance company if the analyzed detected noise and/or the voltage satisfy a respective predetermined condition and/or if an unauthorized attempt to access the device is detected.

11. The device as claimed in claim 2, wherein the electronic circuit further comprises a comparator configured to compare the voltage with a threshold voltage to determine whether the condition for the voltage is fulfilled.

12. The device as claimed in claim 2, wherein the electronic circuit further comprises a switch coupled to a resistor comprised in the electronic circuit, and wherein a state of the switch is configured to alter the condition for the voltage.

13. The device as claimed in claim 1, wherein the machine learning unit comprises predictive premises break-in modelling configured to predict break-in time instances and locations and/or predictive data security break-in modeling configured to predict data security breaches.

* * * * *